(12) United States Patent
Kato

(10) Patent No.: US 6,862,796 B2
(45) Date of Patent: Mar. 8, 2005

(54) METHOD FOR MANUFACTURING AN ELECTRIC ROTARY MACHINE

(75) Inventor: Mitsuru Kato, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/328,148

(22) Filed: Dec. 26, 2002

(65) Prior Publication Data

US 2003/0132679 A1 Jul. 17, 2003

(30) Foreign Application Priority Data

Dec. 26, 2001 (JP) ........................................ 2001-394344
Apr. 26, 2002 (JP) ........................................ 2002-125680

(51) Int. Cl.⁷ ...................... H02K 15/00; H02K 15/14; H02K 15/16
(52) U.S. Cl. .............. 29/596; 29/597; 29/598; 29/605; 29/606; 29/732; 242/599.1; 310/54; 310/179
(58) Field of Search .................. 29/596, 597, 598, 29/605, 606, 732; 242/599.1; 310/54, 179

(56) References Cited

U.S. PATENT DOCUMENTS

| | | | |
|---|---|---|---|
| 5,363,546 A | * 11/1994 | Bradtmueller et al. ..... 29/564.1 |
| 6,124,660 A | 9/2000 | Umeda et al. |
| 6,249,956 B1 | 6/2001 | Maeda et al. |
| 6,424,071 B1 | 7/2002 | Oohashi et al. |
| 6,490,779 B1 | * 12/2002 | Tokizawa et al. ............. 29/596 |
| 6,557,239 B2 | * 5/2003 | Takahashi et al. ............ 29/596 |
| 2001/0007169 A1 | 7/2001 | Takahashi et al. |
| 2002/0047483 A1 | 4/2002 | Oohashi et al. |
| 2002/0053126 A1 | 5/2002 | Maeda et al. |

FOREIGN PATENT DOCUMENTS

| | | | | |
|---|---|---|---|---|
| JP | 57-197738 | 6/1981 | | |
| JP | A 11-27888 | 1/1999 | | |
| JP | A 11 075334 | 3/1999 | | |
| JP | A 11 164519 | 6/1999 | | |
| JP | A 2000-139051 | 5/2000 | | |
| JP | B2 3118837 | 10/2000 | | |
| JP | A 2000-295826 | 10/2000 | | |
| JP | 2000-295826 | * 10/2000 | ......... | H02K/19/22 |
| JP | A 2001-69731 | 3/2001 | | |
| JP | A 2001-069731 | 3/2001 | | |
| JP | B2 3196738 | 6/2001 | | |
| JP | A 2001-197709 | 7/2001 | | |
| JP | A 2001-275283 | 10/2001 | | |
| JP | A 2001-298888 | 10/2001 | | |

* cited by examiner

Primary Examiner—Carl J. Arbes
Assistant Examiner—Tim Phan
(74) Attorney, Agent, or Firm—Oliff & Berridge, PLC

(57) ABSTRACT

A conductor segment constituting a stator coil has a head conductor portion protruding from slots of a stator core for constituting a head side coil end. The head conductor portion of the conductor segment consists of a V-angled portion and straight portions extending straight in the axial direction from both ends of the V-angled portion, so as to form, as a whole, a pentagonal shape.

5 Claims, 14 Drawing Sheets

METHOD FOR MANUFACTURING AN ELECTRIC ROTARY MACHINE

CROSS REFERENCE TO RELATED DOCUMENT

BACKGROUND OF THE INVENTION

The present invention relates to a coil for an electric rotary machine and its manufacturing method, and more particularly to a stator of an automotive electric rotary machine equipped with a coil consisting of serially joined conductor segments and its manufacturing method. Furthermore, the present invention relates to a method for manufacturing an electric rotary machine using this coil.

A conventionally proposed stator coil consists of numerous conductor segments which are inserted into slots of a stator and serially joined each other. For example, Japanese patent No. 3118837 (corresponding to U.S. Pat. No. 6,249,956) or Japanese patent No. 3196738 (corresponding to U.S. patent application publication No. 2002/0053126), owned by the same applicant as that of this application, discloses a method for manufacturing this type of coil according to which U-shaped conductor segments are serially joined.

According to this kind of segmental serial-joint type stator coil, a pair of legs of a conductor segment are separately inserted into different slots of a rotor spaced by an angle equivalent to a pole pitch. A protruding part of each leg is bent in the circumferential direction. Then, the distal ends of the legs of different conductor segments are successively joined.

More specifically, the conductor segment consists of a U-shaped (more accurately, a V-shaped) head conductor portion, a pair of in-slot conductor portions extending from both ends of the head conductor portion and inserted into different slots from one axial side of a core, and a pair of tail conductor portions protruding out of the slots from the other axial side of the core and extending in the circumferential directions. The distal ends of the tail conductor portions of different conductor segments are joined together. Hereinafter, the in-slot conductor portion and the tail conductor portion may be collectively referred to as a leg of the conductor segment. Accordingly, the head conductor portions of respective conductor segments cooperatively constitute a first coil end (i.e., a head side coil end). The tail conductor portions of respective conductor segments cooperatively constitute a second coil end (i.e., a tail side coil end).

Hereinafter, a conventional method for manufacturing this kind of segmental serial-joint type stator coil disclosed in the above-described prior art documents will be explained.

First, a required number of pine-needle conductor segments are prepared. Each prepared pine-needle conductor segment has two elongated legs neighboring to each other and extending straight from its head.

Next, each pine-needle conductor segment is configured into a U-shaped conductor segment with a pair of in-slot conductor portions angularly spaced by one pole pitch in the circumferential direction. Then, the U-shaped conductor segments are spatially disposed (more specifically, aligned in the circumferential direction) so that a required number of conductor segments are simultaneously inserted into each slot of the stator core. For the above-described process, it is possible to use a pair of coaxial rings having insertion holes, for example, disclosed in FIG. 3 of Japanese Patent No. 3118837. According to the manufacturing process shown in this prior art, both legs of a pine-needle conductor segment are inserted into two adjacent holes of the coaxial rings which are positioned in the same angular position. Then, the coaxial rings are mutually rotated about their axes by the amount corresponding to one pole pitch in the circumferential direction. As a result, each pine-needle conductor segment is configured into a U-shaped conductor segment with a head portion straddling so as to form, as a whole, a U shape in the circumferential direction.

Next, a process for inserting each conductor segment, formed into a U-shaped configuration and aligned in the circumferential direction, into a slot of the core is performed. This process is performed by pulling the legs out of the rings having insertion holes, while holding the head conductor portions of respective conductor segments each being formed into a U-shaped configuration and aligned in the circumferential direction, and then inserting the legs of respective conductor segments into slots of the core.

When a total of four in-slots conductor portions are aligned in the radial direction in the same slot, a small U-shaped turning conductor segment and a large U-shaped turning conductor segment are manufactured. Two legs of the small U-shaped turning conductor segment are simultaneously inserted into slots of the core according to the above-described method. Then, two legs of the large U-shaped turning conductor segment are simultaneously inserted into slots of the core according to the above-described method. However, it is of course possible to insert the U-shaped conductor segments into slots one by one. The process for configuring each pine-needle conductor segment into a U-shaped conductor segment can be performed by press work without using the above-described rings with insertion holes.

Next, a process for bending each tail conductor portion protruding out of the slot in the circumferential direction is performed. Preferably, each tail conductor portion is bent in the circumferential direction by a half pole pitch. Such circumferential bending process is performed by using a plurality of coaxial rings having insertion holes, for example, disclosed in FIGS. 4 and 5 of Japanese Patent No. 31967398. The distal ends of tail conductor portions are inserted into insertion holes of the coaxial rings. Then, each coaxial ring is rotated in the circumferential direction by a half pole pitch (electric angle of $\pi/2$), so that each tail conductor portion is bent in the circumferential direction by a half pole pitch. When each coaxial ring is rotated in the circumferential direction, it is preferable to urge the coaxial ring in the axial direction so as to advance toward the tail conductor portion. The curvature at the bend point can be enlarged.

Next, a process for welding the distal ends of the tail conductor portions is performed. According to the above-described example, the small U-shaped turning conductor segment and the large U-shaped turning conductor segment are accommodated in the same slot in such a manner that a total of four in-slot conductor portions are aligned in the radial direction. In this case, the in-slot conductor of the innermost layer and the in-slot conductor of the outermost layer are mutually connected via a head conductor portion of a large U-shaped turning conductor segment. The in-slot conductor of the inner middle layer and the in-slot conductor of the outer middle layer are mutually connected via a head conductor portion of a small U-shaped turning conductor segment. The distal end of a tail conductor portion of the innermost layer is welded to the distal end of a tail conductor portion of the inner middle layer. The distal end of a tail conductor portion of the outermost layer is welded to the distal end of a tail conductor portion of the outer middle layer. Through the above-described welding process, an endless phase coil, as a coil representing one of the phases, is formed. To form extraction terminals of each phase coil at the head side, one of U-shaped head conductor portions is cut at an appropriate position. When the extraction terminals are formed to be long enough, the elongated portions can be bent in the circumferential direction so as to provide a connecting wire for a neutral point. The reason why such extraction terminals are formed at the head side coil end is to avoid the interference with the welding process performed at the tail side coil end.

Preferably, on pole pitch is constituted by six neighboring slots. An electric angle of 2π is constituted by 12 neighboring slots. In this case, the slot layout is expressed by U, X,–V,–Z, W, Y,–U,–X, V, Z,–W, and –Y. According to this slot layout, the mutually neighboring U-phase and X-phase coils are serially connected with a neutral point at one end and a U-X output terminal at the other end. The mutually neighboring W-phase and Y-phase coils are serially connected with a neutral point at one end and a W-Y output terminal at the other end. The mutually neighboring V-phase and Z-phase coils are serially connected with a neutral point at one end and a V-Z output terminal at the other end.

However, according to the above-described segmental serial-joint type stator coil, the U-shaped head conductor portion of the U-shaped conductor segment is sharply bent at an opening of the slot through which the conductor segment is inserted. The U-shaped conductor segment inclines in the circumferential direction. Hence, an insulating resin film covering the surface of the conductor segment directly faces the sharp edge of the slot opening. When the conductor segment is subjected to any stress or damage, the insulating resin film of the conductor segment will be worn. The insulation properties will be worsened. In general, an insulating sheet intervenes between the core and the conductor segment so as to insulate the in-slot conductor portion from the inner surface of the slot. However, it is known that surface discharge occurs between neighboring conductor segments. Considering this fact, it is very important to improve electric insulation properties of the U-shaped head conductor portion of each conductor segment whose roots are bent at the slot opening.

Furthermore, the head side coil end is constituted by U-shaped head conductor portions which are bent in the circumferential direction at the portion very close to the slot opening. This arrangement significantly reduces a clearance for cooling air flowing in the radial direction. Especially, a circumferential cross-sectional area available for the cooling air is insufficient at a portion adjacent to the end surface of the core. Hence, the cooling ability of the core is worse.

Furthermore, the cooling ability of the coil is a decisive factor for an advanced electric rotary machine which is compact in size and large in output power. The cooling ability of the coil is greatly dependent on the coil ends because heat exchange between the coil and the cooling air is chiefly performed at the coil ends. The cooling surfaces of the coil end is roughly proportional to the longitudinal length of the coil end. Accordingly, to improve the cooling ability of the coil, it is necessary to increase the longitudinal length (i.e., extension length) of each U-shaped head conductor portion. However, this leads to undesirable increase in the axial length of the head side coil end and will result in a significant scale-up in the size as well as in the weight of a resulting rotary machine.

SUMMARY OF THE INVENTION

In view of the foregoing problems of the prior arts, an object of the present invention is to provide a coil for an electric rotary machine which is capable of improving the reliability and the cooling ability without increasing the size. Another object of the present invention is to provide a method for manufacturing this coil. Another object of the present invention is to provide a method for manufacturing an electric rotary machine using this coil.

To accomplish the above and other related objects, the present invention provides a coil for an electric rotary machine including a plurality of conductor segments each having a V-shaped head conductor portion, a pair of in-slot conductor portions extending from both ends of the head conductor portion and accommodated in two different slots of a core, and a pair of tail conductor portions continuing from the in-slot conductor portions and protruding out of axially opposite openings of the slots and extending at least in a circumferential direction. The conductor segments are successively connected by joining distal ends of the tail conductor portions. The head conductor portion of each conductor segment constitutes part of a head side coil end of the coil. The tail conductor portion of each conductor segment constitutes part of a tail side coil end of the coil. The head conductor portion or the tail conductor portion includes a V-angled portion and straight portions. Each V-angled portion includes an apex positioned farthest in an axial direction from the core and slant portions extending from the apex in both circumferential directions so as to gradually approach to an end surface of the core. Each of the straight portions is bent from the angled portion so as to extend straight in a line with the in-slot conductor portion. An axial length of each straight portions is longer than an axial length of the V-angled portion.

According to this invention, the head conductor portion of each conductor segment includes the V-angled portion with its apex (positioned farthest in the axial direction from the core) and the slant portions extending from the apex in both circumferential directions so as to gradually approach to the end surface of the core. In addition, the head conductor portion of each conductor segment includes the straight portions each of which is bent from the end of the angled portion so as to extend straight in a line with the in-slot conductor portion. With this arrangement, it becomes possible to solve the above-described problems. The reliability and the cooling ability can be improved without increasing the size.

Hereinafter, details of the present invention will be explained.

First, according to the present invention, the head conductor portion of each conductor segment, constituting part of the head side coil end, consists of the V-angled portion and a pair of straight portions extending straight in the axial direction from this angled portion. A resin film covering the surface of the conductor segment is likely to wear at the bend point, i.e., a boundary between the V-angled portion and each straight portion. However, according to this invention, the boundary between the V-angled portion and each straight portion is positioned far from the side surface of the core. This effectively prevents the boundary between the V-angled portion and each straight portion (i.e., the bend point of the conductor segment) from being strongly pressed to the sharp edge of a slot opening. Thus, it becomes possible to prevent the insulation properties of the resin film at this boundary from worsening.

Furthermore, according to the present invention, the head conductor portion constituting the head side coil end includes a pair of straight portions each continuously extending in the axial direction from the in-slot conductor portion. These straight portions are connected to both ends of the V-angled portion. Hence, the cooling air can smoothly flow in radial directions via the clearances between the slots arrayed at predetermined angular intervals in the circumferential direction without being blocked by the conductor segments. In this case, the clearances between the slots are portions which are next to so-called teeth of the stator core in the axial direction. Thus, cooling performance of the stator core is improved.

Furthermore, according to the present invention, the head conductor portion constituting the head side coil end is configured into a pentagonal shape because a pair of straight portions continuously extend in the axial direction from the in-slot conductor portions and connected to both ends of the V-angled portion. As a result, a total length of the head conductor portion is longer than that of a conventional triangular one (which is immediately bent at the slot opening edge) under the condition that the axial protruding length of the head conductor portion is the same. The total surface of the head conductor portion to be exposed to the cooling air is increased. This is effective to improve the cooling performance of the head side coil end.

Furthermore, according to the present invention, the axial length of each straight portions is longer than the axial length of the V-angled portion. The total extension length of the head conductor portion increases. This effectively improves the cooling performance of the head side coil end. Especially, when the forced cooling air flows in radial directions, the air flow loss is greatly reduced due to enlarged air flowing passage area.

A preferable embodiment of the present invention provides a method for manufacturing the coil for an electric rotary machine including a conductor segment inserting process, a conductor segment returning process, a tail conductor portion twisting process, and a joining process. The conductor segment inserting process is for inserting each conductor segment into a slot of the core in the axial direction until a bend point between the angled portion and each straight portion reaches an axially near-side opening of the slot, while allowing each tail conductor portion to protrude out of the core from an axially far-side opening of the slot. The conductor segment returning process is for returning the conductor segment back in the axial direction by a predetermined length to form the head side coil end. The tail conductor portion twisting process is for twisting the each tail conductor portion in the circumferential direction by a predetermined angle. And, the joining process is for joining the distal ends of the tail conductor portions according to predetermined pairings.

This manufacturing method makes it possible to accurately form the above-described straight portions constituting the head conductor portion of the conductor segment.

Furthermore, the present invention provides a method for manufacturing an electric rotary machine including a winding and a core. The winding consists of a plurality of conductor segments, each including a V-shaped head conductor portion and a pair of straight conductor portions extending from both ends of the V-shaped portion, which are covered by an insulating film and successively joined at distal ends of the straight conductor portions. The core includes a plurality of slots arrayed at predetermined angular intervals in a circumferential direction for accommodating the conductor segments. Each of the slots has an axially near-side opening through which the straight conductor portion is inserted into the slot and an axially far-side opening from which the distal end of the straight conductor portion protrudes. The V-shaped head conductor portion of each conductor segment is held at one side of the core where the axially near-side opening is provided, and protruding portions of the straight conductor portions are held at the other side of the core where the axially far side opening is provided.

This method for manufacturing an electric rotary machine includes an accommodating process, a twist shaping process, and a shifting process. The accommodating process is for accommodating the straight conductor portions of each conductor segment into different slots so that at least part of each straight conductor portion extends as an exposed straight portion out of the slot from either the axially near-side opening or the axially far-side opening by a predetermined length. The twist shaping process is for twisting the protruding portions of the straight conductor portions in the circumferential direction. And, the shifting process is for shifting the straight conductor portion into the slot from one of the axially near-side opening or the axially far-side opening so that at least part of the exposed straight portion is accommodated in the slot and allowing the straight conductor portion to protrude out of the slot as another exposed straight portion from the other of the axially near-side opening or the axially far-side opening.

According to this manufacturing method, a sufficient distance is provided between a bend point of the twisted protruding portion and a sharp edge of the slot opening. Accordingly, it becomes possible to prevent the insulating film covering the surface of the conductor segment from being worn or wounded.

Preferably, the shifting process is performed in such a manner that the straight conductor portion is stopped at a predetermined axial position so that exposed straight portions exist at both of the axially near-side opening and the axially far-side opening of the slot.

According to this method, it becomes possible to provide a sufficient clearance or offset for a bend point of the conductor segment at both sides of the core.

Preferably, the twist shaping process is performed in such a manner that the protruding portion of each straight conductor portion is bent about the axially far-side opening of the slot, and then the shifting process is performed in such a manner that a bend point of the protruding portion of each straight conductor portion is offset far from the axially far-side opening of the slot.

According to this method, the twist shaping process can be easily performed without using special jigs.

Preferably, the method for manufacturing an electric rotary machine further includes a joining process, succeeding the shifting process, for successively joining the distal ends of the straight conductor portions according to predetermined pairing.

Preferably, the method for manufacturing an electric rotary machine further includes a holding member inserting process, succeeding the shifting process, for inserting a holding member between an inner wall of the slot and the straight conductor portion accommodated in the slot.

According to a preferable embodiment of the present invention, the conductor segment is a V-shaped segment constituted by a piece of conductor member. This is advantageous in that the above-described joining process is performed only at the tail conductor side. However, it is also possible to constitute the V-shaped segment by connecting a plurality of members, such as an I-shaped or L-shaped conductor members. When the I-shaped conductor member is inserted into a slot, both ends of the I-shaped conductor member are bent to constitute a half of the V-shaped segment. When the L-shaped conductor member is used, one end of this conductor member is already inclined to constitute a half of the V-shaped segment. Hence, after the L-shaped conductor member is inserted into a slot, the remaining straight end of the L-shaped conductor member is bent to form a half of the V-shaped segment.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

Figure 1:
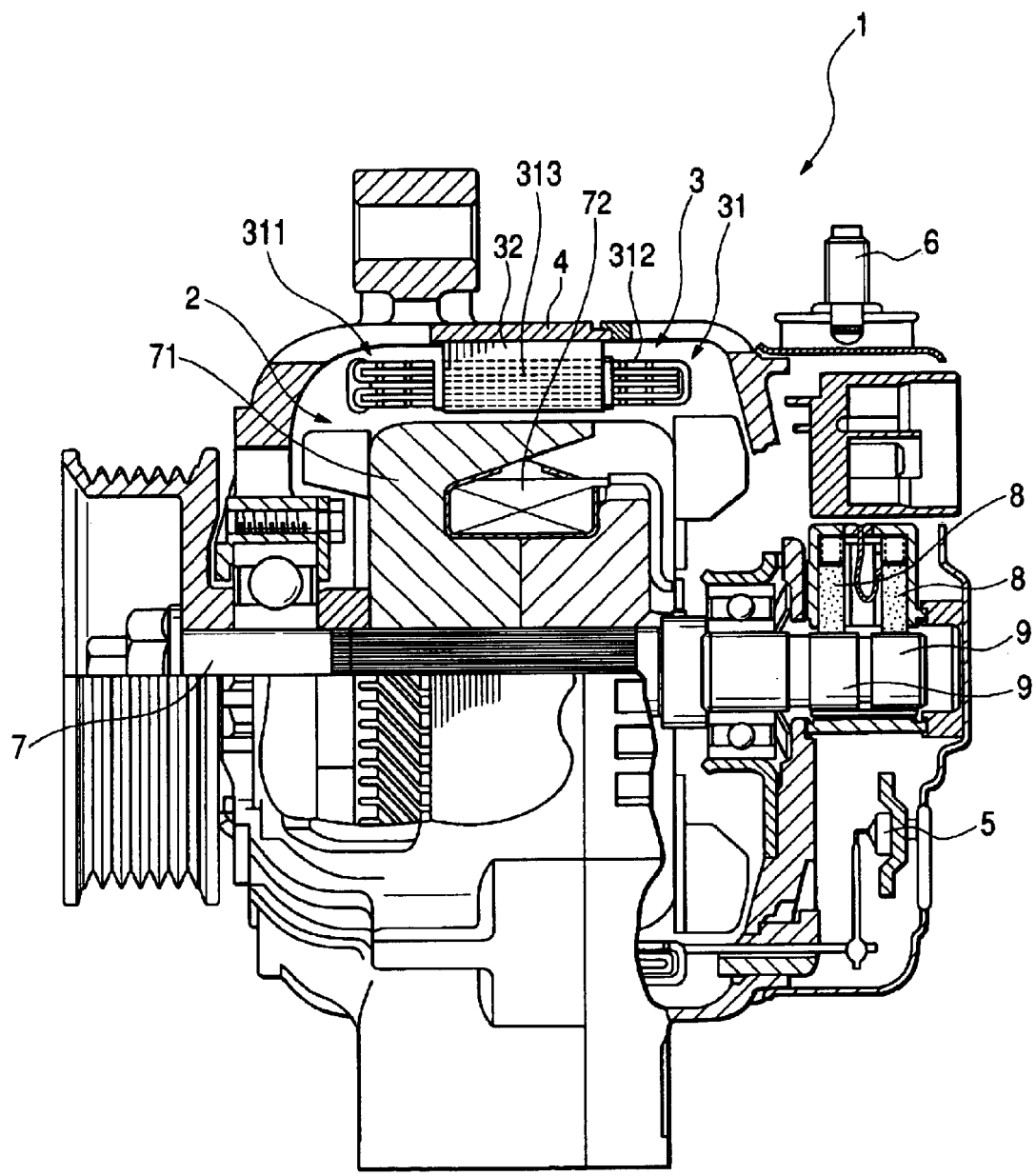
FIG. 1 is a vertical cross-sectional view showing an automotive alternator in accordance with a preferred embodiment of the present invention.
Figure 2:
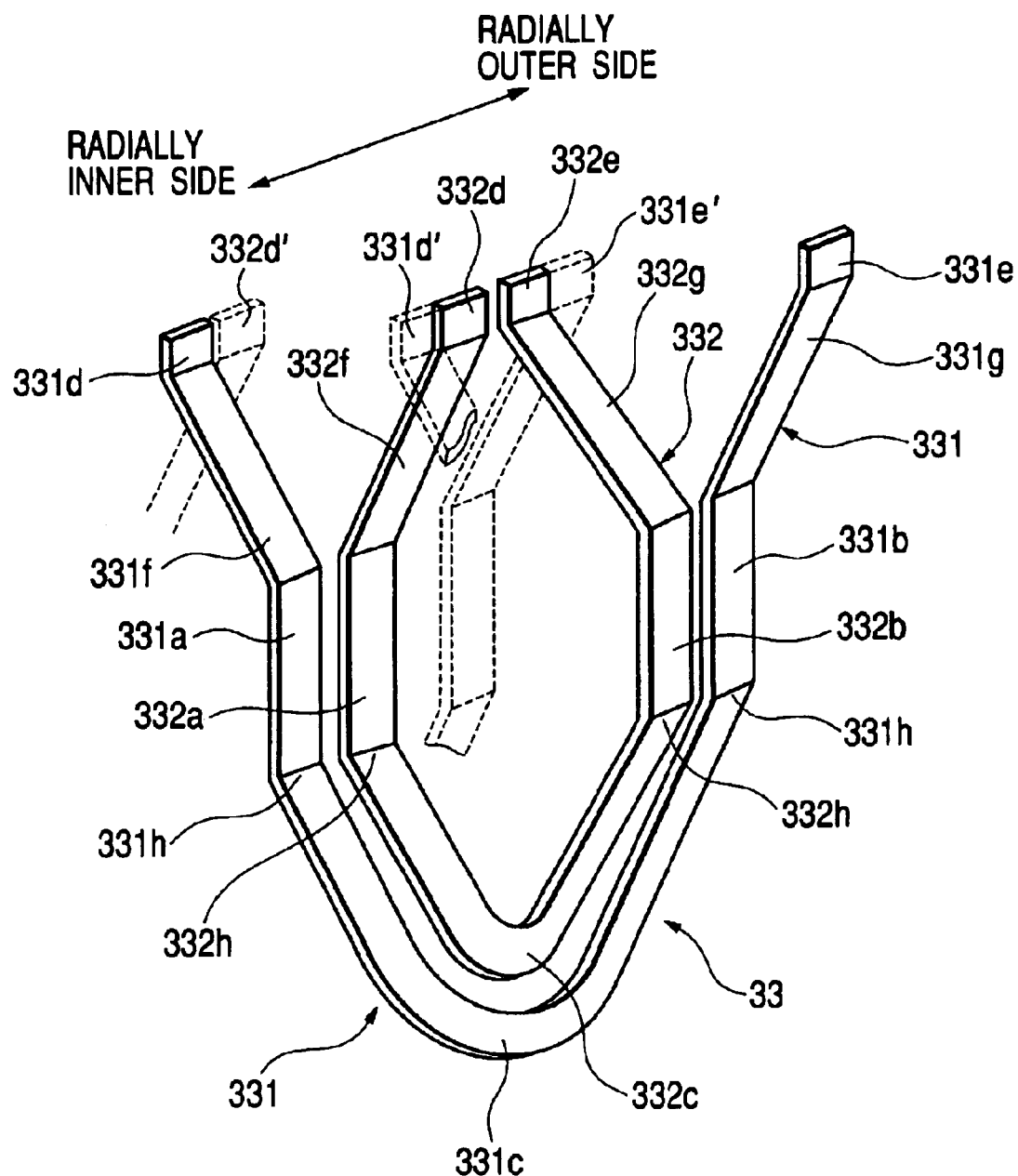
FIG. 2 is a perspective view schematically showing conductor segments serving as part of a stator coil shown in FIG. 1.
Figure 3:
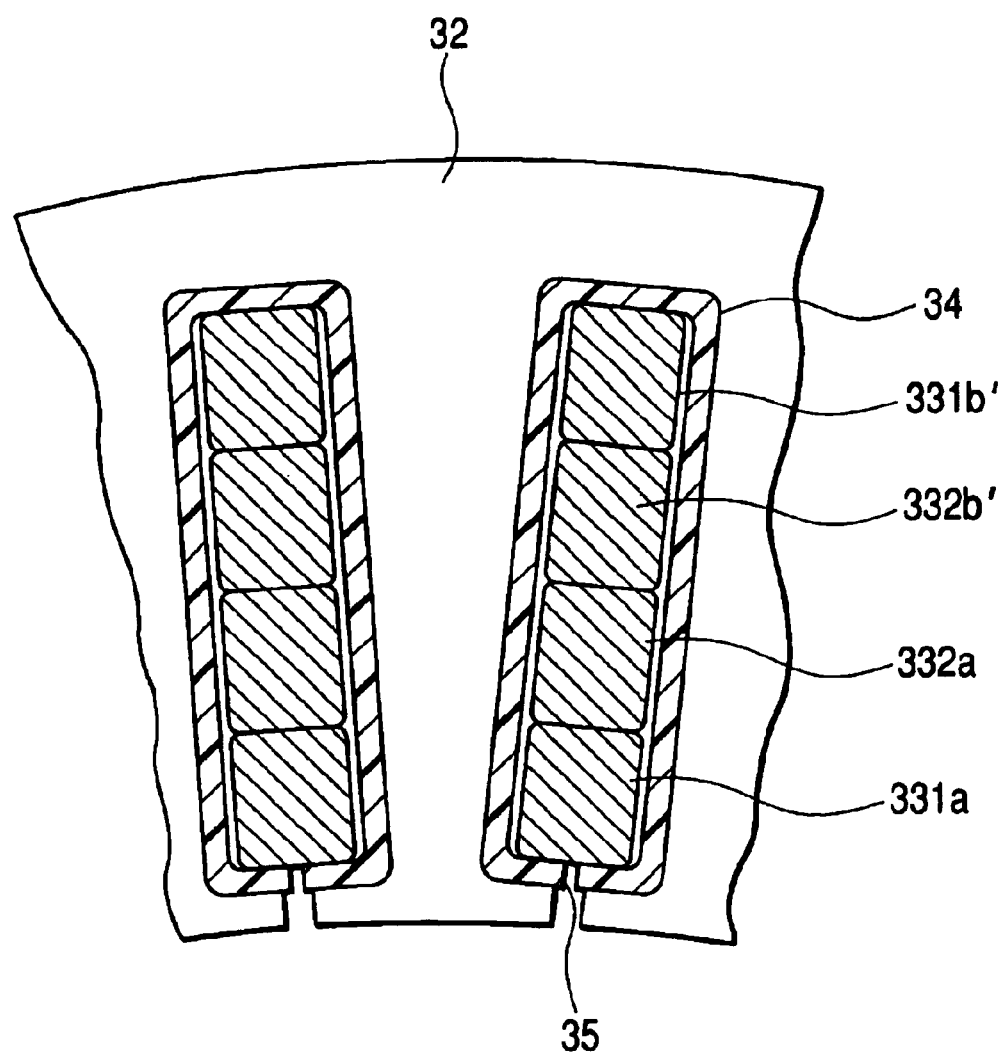
FIG. 3 is a cross-sectional view showing the conductor segments accommodated in each slot of the stator core shown in FIG. 1.

Hereinafter, a stator coil for an automotive alternator in accordance with a preferred embodiment of the present invention and its manufacturing method will be explained with reference to attached drawings. FIG. 1 is a vertical cross-sectional view showing an automotive alternator in accordance with a preferred embodiment of the present invention. FIG. 2 is a perspective view showing conductor segments serving as part of a stator coil. FIG. 3 is a cross-sectional view showing the condition of conductor segments accommodated in each slot.

Overall Arrangement

As shown in FIG. 1, an automotive alternator 1 includes a rotor 2, a stator 3, a housing 4, a rectifier 5, an output terminal 6, a rotary shaft 7, a brush 8, and a slip ring 9. The stator coil 3 includes a stator coil 31 and a stator core 32. The stator core 32 is fixed on an inner cylindrical wall of the housing 4. The stator coil 31 is wound in each slot of the stator core 32. The rotor 2 includes a Lundel-type rotor core 71 and a field coil 72. The Lundel-type rotor core 71 is fixed to the rotary shaft 7. The rotary shaft 7 is rotatably supported in the housing 4 which is stationary. The field coil 72 is wound around the rotor core 71. The rotor 2 is disposed radially inside the stator 3. The stator coil 31 is a three-phase armature winding which produces three-phase alternating-current voltages from its three alternating-current output terminals. The rectifier 5, constituting a three-phase full wave rectifying circuit, rectifies the three-phase alternating-current voltages produced from the stator coil 31. The field coil 72 is magnetized when it receives a field current supplied via the brush 8 and the slip ring 9. The magnetized field coil 72 generates a magnetic field. The field current supplied to the field coil 72 is generally adjusted by a regulator (not known) so as to maintain the generator voltage at a predetermined level. This kind of automotive alternator is conventionally well known in its structure and its operations. Therefore, no further detailed explanation for it will be necessary.

Stator Coil 31

The stator coil 31 is constituted by a predetermined number of conductor segments 33 shown in FIG. 2. Each conductor segment 33, inserted into a slot of the stator core 32 from one side, extends in the slot and protrudes out of the stator core 32 from the other side. The protruding portion of the conductor segment 33, having a predetermined length, is twisted in the circumferential direction by an amount equivalent to an electric angle of π/2. The protruding portions of conductor segments 33 are welded at their distal ends according to predetermined combinations or pairings.

Each conductor segment 33 has an elongated plate body configured as a whole into U shape which is sheath by a resin film except for the distal ends of the protruding portions, i.e., except for the distal end portions to be welded. This kind of stator coil itself, as characterized by sequentially connected conductor segments, is well known, too.

The detailed arrangement of conductor segment 33 is explained hereinafter.

The conductor segment 33 consists of a pentagonal head conductor portion, a pair of in-slot conductor portions, and a pair of protruding tail conductor portions. The in-slot conductor portions extend straight and parallel to each other from bifurcated ends (i.e., bend points) of the pentagonal head conductor portion. The protruding tail conductor portions extend outward from the corresponding in-slot conductor portions. In other words, the stator coil 31 consists of a first coil end portion (i.e., a head side coil end) 311, a second coil end portion (i.e., an tail side coil end) 312, and the in-slot conductor portions. The first coil end portion 311, formed as a whole into a ring shape, is disposed at one side of the stator core 32. The second coil end portion 312, formed as a whole into a ring shape, is disposed at the other side of the stator core 32. The in-slot conductor portions are disposed in the slots of the stator core 32. Namely, the first coil end portion 311 is constituted by the head conductor portions of the conductor segments 33, while the second coil end portion 312 is constituted by the protruding tail conductor portions of the conductor segments 33.

The conductor segment 33, as shown in FIG. 2, includes a large (turning) conductor segment 331 having a large turning head conductor portion and a small (turning) conductor segment 332 having a small turning head conductor portion.

The large turning conductor segment 331 consists of a head conductor portion 331c, a pair of in-slot conductor portions 331a and 331b, and a pair of protruding tail conductor portions 331f and 331g. The in-slot conductor portions 331a and 331b extend straight in parallel with each other and are continuous from both ends of the head conductor portion 331c. The boundary between the head conductor portion 331c and each in-slot conductor portion 331a or 331b is a bend point 331h. The protruding tail conductor portions 331f and 331g are continuous from the corresponding in-slot conductor portions 331a and 331b and have distal ends 331d and 331e which are portions to be welded. In this respect, the distal ends 331d and 331e can be also referred to as joint portions. The in-slot conductor portion 331a is positioned in the innermost layer. The in-slot conductor portion 331b is positioned in the outermost layer.

The small turning conductor segment 332 consists of a head conductor portion 332c, a pair of in-slot conductor portions 332a and 332b, and a pair of tail conductor portions 332f and 332g. The in-slot conductor portions 332a and 332b extend straight in parallel with each other and are continuous from both ends of the head conductor portion 332c. The boundary between the head conductor portion 332c and each in-slot conductor portion 332a or 332b is a bend point 332h. The tail conductor portions 332f and 332g are continuous from the corresponding in-slot conductor portions 332a and 332b and have distal ends 332d and 332e which are portions to be welded. In this respect, the distal ends 332d and 332e can be also referred to as joint portions. The in-slot conductor portion 332a is positioned in the inner middle layer. The in-slot conductor portion 332b is positioned in the outer middle layer.

Regarding the symbol ' attached to numeral in the drawing, it means that a portion accompanied by the symbol ' is identical with the portion denoted by the same reference numeral. Accordingly, in FIG. 2, the joint portions 331d and 332d', which are aligned next to each other in the radial direction, are welded together. Similarly, the joint portions 332d and 331d', which are aligned next to each other in the radial direction, are welded together. The joint portions 332e and 331e', which are aligned next to each other in the radial direction, are welded together.

According to FIG. 2, the in-slot conductor portion 331a of the innermost layer and the in-slot conductor portion 332a of the inner middle layer are accommodated in a predetermined slot of the stator core 32. In this case, the other in-slot conductor portion 331b of the conductor segment 331, positioned in the outermost layer, is accommodated in a different slot of the stator core 32 which is angularly offset from that of the in-slot conductor portion 331a by an amount equivalent to a predetermined odd number of pole pitch T (according to this embodiment, one magnetic pole pitch (=electric angle of $\pi$)). The other in-slot conductor portion 332b of the conductor segment 332, positioned in the outer middle layer, is accommodated in the same slot as that of the in-slot conductor portion 331b of the conductor segment 331. The head conductor portion 331c of the large turning conductor segment 331 surrounds the head condition where the conductor segments 331 and 332 are disposed in the slots of stator core 32.

FIG. 3 shows the layout of the conductor segments accommodated in the slots of stator core 32.

The in-slot conductor portion 331a of the innermost layer is disposed at a radially innermost end of the slot 35 of stator core 32. Disposed radially outer side with respect to the in-slot conductor portion 331a are successively, in this order, the in-slot conductor portion 332a of the inner middle layer, the in-slot conductor portion 332b' of the outer middle layer, and the in-slot conductor portion 331b' of the outermost layer. In short, each slot 35 accommodates a total of four in-slot conductor portions of four layers aligned in the radial direction. In FIG. 3, the in-slot conductor portion 332b' belongs to a small turning conductor segment 332 which differs from the small turning conductor segment 332 having the in-slot conductor portion 332a. Similarly, the in-slot conductor portion 331b' belongs to a large turning conductor segment 331 which differs from the large turning conductor segment 331 having the in-slot conductor portion 331a.

Figure 4:
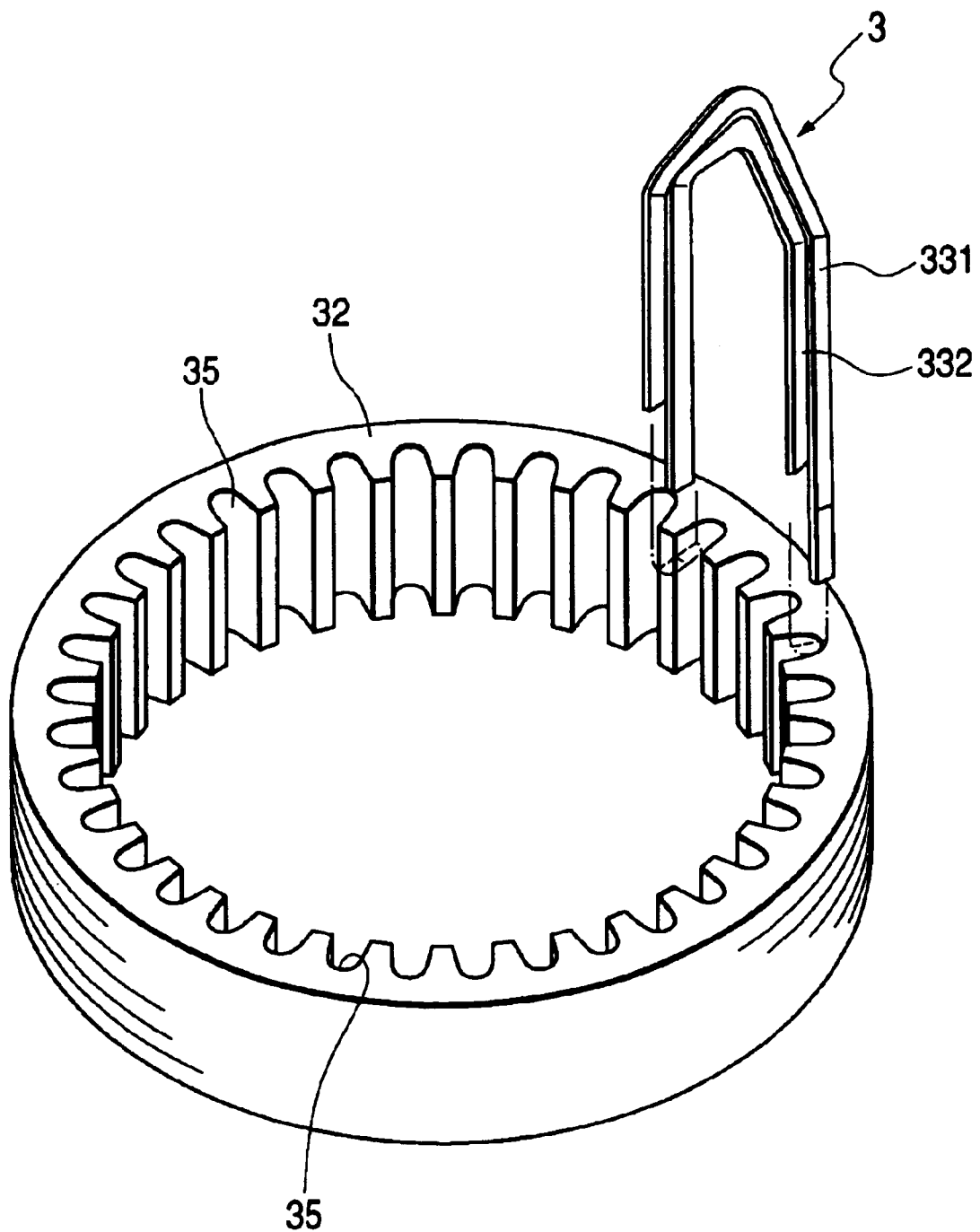
FIG. 4 is a perspective view schematically showing the conductor segments and the slots of the stator core into which the conductor segments are installed.

FIG. 4 shows how the large turning conductor segment 331 and the small turning conductor segment 332 which are inserted into the slots 35.

Manufacturing Method

1. Head Portion Twisting Process (i.e., U-shaped Segment Forming Process)

First of all, the process for twisting the head conductor portion will be explained hereinafter, although the substance of this process is conventionally well known.

A required number of conductor segments, each having a pine-needle shape, are prepared. Each prepared conductor segment has two elongated legs neighboring to each other and extending straight from its head being sharply bent. Next, each pine-needle conductor segment is configured into a U-shaped conductor segment with a pair of in-slot conductor portions angularly spaced by one pole pitch in the circumferential direction. Then, the U-shaped conductor segments are spatially disposed (more specifically, aligned in the circumferential direction) so that a required number of conductor segments are simultaneously inserted into each slot of the stator core. For the above-described process, it is possible to use a pair of coaxial rings having insertion holes, for example, disclosed in FIG. 3 of Japanese Patent No. 3118837. According to the manufacturing process shown in this prior art, both legs of a pine-needle conductor segment are inserted into two adjacent holes of the coaxial rings which are positioned in the same angular position. Then, the coaxial rings are mutually rotated about their axes by the amount corresponding to one pole pitch in the circumferential direction. As a result, each pine-needle conductor segment is configured into a V-shaped conductor segment with a head portion straddling so as to form, as a whole, a V shape in the circumferential direction.

According to this embodiment, the process of twisting the head conductor portion of a small turning conductor segment of a pine-needle shape is performed by using an inner middle layer ring and an outer middle layer ring which are coaxial with each other and rotatable in the circumferential direction to cause an angular shift between them. The inner middle layer ring has a radius corresponding to a radial position of the in-slot conductor portion of the inner middle layer. The inner middle layer ring has a predetermined number of insertion holes angularly arranged so as to correspond to respective in-slot conductor portions of the inner middle layer. Similarly, the outer middle layer ring has a radius corresponding to a radial position of the in-slot conductor portion of the outer middle layer. The outer middle layer ring has a predetermined number of insertion holes angularly arranged so as to correspond to respective in-slot conductor portions of the outer middle layer.

Installation of each small turning conductor segment of a pine-needle shape is performed in the following manner. First, the in-slot conductor portions of the inner middle layer are inserted into insertion holes of the inner middle layer ring. Then, the in-slot conductor portions of the outer middle layer are inserted into insertion holes of the outer middle layer ring. Next, the head portions of respective small turning conductor segments are fixed together with a holding plate to prevent them from rotating. Then, the inner middle layer ring and the outer middle layer ring are respectively rotated oppositely by a half pole pitch in the circumferential direction so as to cause an angular shift between them equivalent to one pole pitch. Through this twisting process, the small U-shaped turning conductor segment 332 is obtained as shown in FIG. 2. The holding plate, in this case, relocates in the axial direction as the apex of the head portion of each small turning conductor segment moves toward the side flat surfaces of the coaxial rings in accordance with deformation of the head portion when configured into the U shape from its original pine-needle shape.

Similarly, according to this embodiment, the process of twisting the head conductor portion of a large turning conductor segment of a pine-needle shape is performed by using an innermost layer ring and an outermost layer ring which are coaxial with each other and rotatable in the circumferential direction to cause an angular shift between them. The innermost layer ring has a radius corresponding to a radial position of the in-slot conductor portion of the innermost layer. The innermost layer ring has a predetermined number of insertion holes angularly arranged so as to correspond to respective in-slot conductor portions of the innermost layer. The outermost layer ring has a radius corresponding to a radial position of the in-slot conductor portion of the outermost layer. The outermost layer ring has a predetermined number of insertion holes angularly arranged so as to correspond to respective in-slot conductor portions of the outermost layer.

Installation of each large turning conductor segment of a pine-needle shape is performed in the following manner. First, the in-slot conductor portions of the innermost layer are inserted into insertion holes of the innermost layer ring. Then, the in-slot conductor portions of the outermost layer are inserted into insertion holes of the outermost layer ring. Next, the head portions of respective large turning conductor segments are fixed together with a holding plate to prevent them from rotating. Then, the innermost layer ring and the outermost layer ring are respectively rotated oppositely by a half pole pitch in the circumferential direction so as to cause an angular shift between them equivalent to one pole pitch. Through this twisting process, the large U-shaped turning conductor segment 331 is obtained as shown in FIG. 2. The holding plate, in this case, relocates in the axial direction as the apex of the head portion of each large turning conductor segment moves toward the side flat surfaces of the coaxial rings in accordance with deformation of the head portion when configured into the U shape from its original pine-needle shape.

2. Conductor Segment Installing Process

Next, the small U-shaped turning conductor segments 332 are pulled out of the insertion holes of the above-described rings. As representatively shown in FIG. 4, the small U-shaped turning conductor segments 332 are installed into the slots 35 of stator core 32 so as to straddle between a position corresponding to the inner middle layer and a position corresponding to the outer middle layer. In this case, the small U-shaped turning conductor segments 332 are assembled together with the above-described holding plate so that the small U-shaped turning conductor segments 332 can be installed into corresponding slots 35 at a time. After accomplishing installation of the small U-shaped turning conductor segments 332 into the slots 35 of stator core 32, the holding plate is removed.

Similarly, the large U-shaped turning conductor segments 331 are pulled out of the insertion holes of the above-described rings. As representatively shown in FIG. 4, the large U-shaped turning conductor segments 331 are installed into the slots 35 of stator core 32 so as to straddle between a position corresponding to the innermost layer and a position corresponding to the outermost layer. In this case, the large U-shaped turning conductor segments 331 are assembled together with the above-described holding plate so that the large U-shaped turning conductor segments 331 can be installed into corresponding slots 35 at a time. After accomplishing installation of the large U-shaped turning conductor segments 331 into the slots 35 of stator core 32, the holding plate is removed.

The process for installing the large U-shaped turning conductor segments 331 and the small U-shaped turning conductor segments 332 into the slots 35 is not limited to the above-described one, and therefore can be variously changed.

Figure 5:
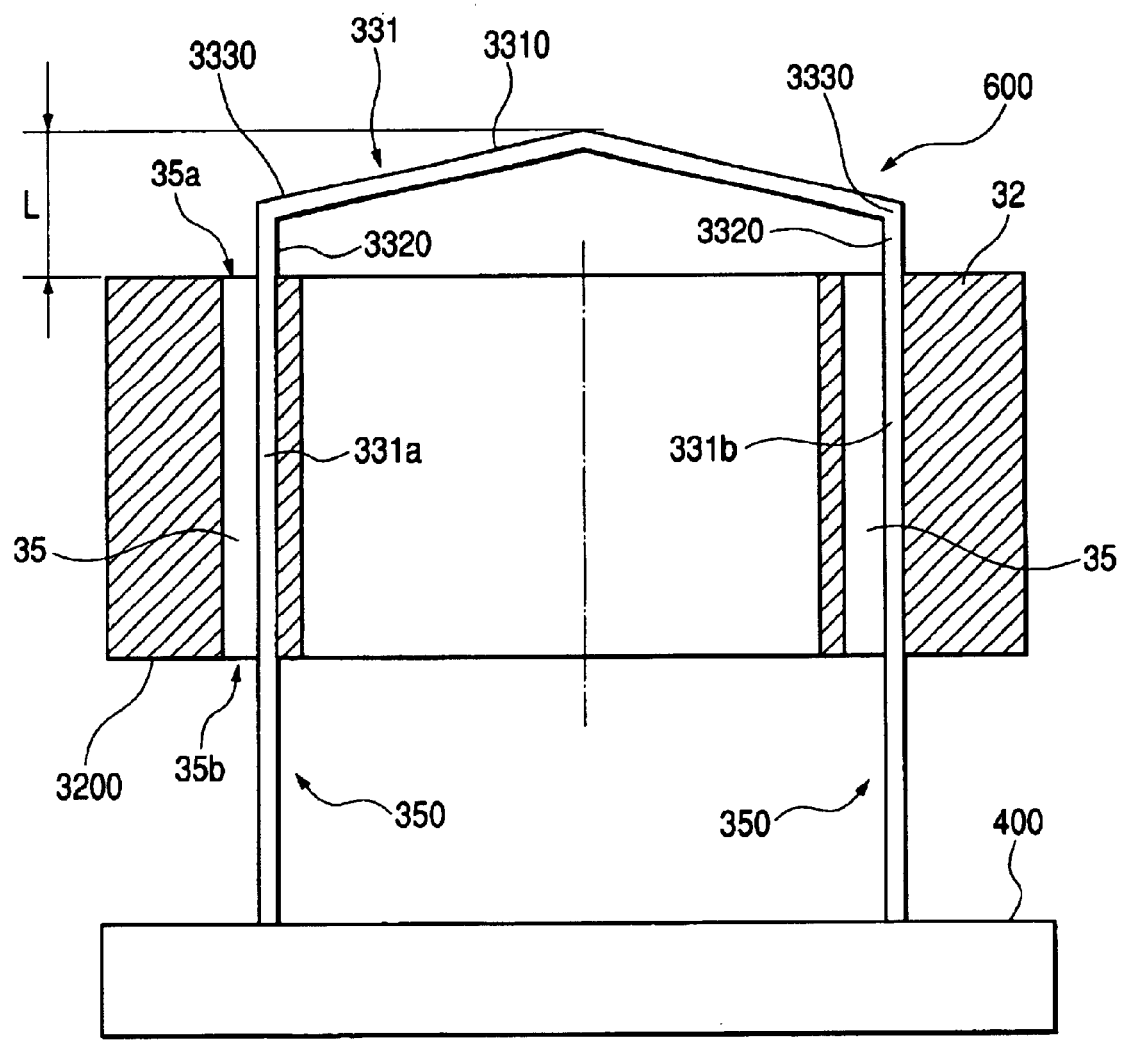
FIG. 5 is a cross-sectional view schematically showing the conductor segments installed in the slots of the stator core.

In this conductor segment installing process, the insertion depth of the conductor segments 331 and 332 is regulated in the following manner. As schematically shown in FIG. 5, protruding distal end portions 350 of each conductor segment 331 or 332 are restricted so as to protrude by a predetermined length from an end surface 3200 of the stator core 32. The protruding distal end portions 350 of the conductor segment 331 correspond to the protruding tail conductor portions 331f and 331g shown in FIG. 2. The protruding distal end portions 350 of the conductor segment 332 correspond to the protruding tail conductor portions 332f and 332g shown in FIG. 2.

Regulating the axial length of the protruding distal end portions 350 can be easily realized by using a stopper plate 400 which surely prevents the protruding distal end portions 350 from excessively protruding beyond the predetermined length.

The above-described protruding length regulation of the protruding distal end portions 350 realized by the use of stopper plate 400, as schematically shown in FIG. 5, leaves the large U-shaped turning conductor segment 331 (although the conductor segment 332 is omitted in the drawing) which includes, at one axial side of the stator core, a V-angled portion 3310 and a pair of straight portions 3320. The straight portions 3320 are parallel to each other and extend straight in the axial direction form bend points 3330 (i.e., the boundary between the V-angled portion 3310 and each straight portion 3320). The straight portions 3320 are further continuous with respective in-slot conductor portions 331a and 331b disposed in the slots 35. The straight portions 3320 are in a line with the in-slot conductor portions 331a and 331b. In other words, the V-angled portion 3310 and a pair of straight portions 3320 cooperatively constitute a head conductor portion of the U-shaped conductor segment 331 which serves as a head side coil end (although the conductor segment 332 is omitted in the drawing). Regarding the small U-shaped turning conductor segment 332, the same result is obtained.

Modified Embodiment

According to the above-described embodiment, the stopper plate 400 is used to regulate the length of the protruding distal end portions 350 protruding from the stator core 32, thereby securing the straight portions 3320. Alternatively, it is possible to fully insert the U-shaped conductor segment 331 or 332 until the bend point 3330 (i.e., boundary) between the V-angled portion 3310 and each straight portion 3320 reaches the end surface of the stator core 32 and subsequently push or pull bach the U-shaped conductor segment 331 or 332 in the axial direction by a predetermined length so as to leave the straight portions 3320.

3. Tail Portion Twisting Process

Next, the process for twisting the tail conductor portion of the conductor segment 33 inserted in the slot of the stator will be explained hereinafter, although the substance of this process is conventionally well known.

According to this embodiment, the large turning conductor segment 331 includes the outermost layer in-slot conductor portion 331b and the tail conductor portion 331g. The tail conductor portion 331g (which may be referred to as an outer layer side end portion), connected to the outermost layer in-slot conductor portion 331b, is twisted in a predetermined circumferential direction. Furthermore, the large turning conductor segment 331 includes the innermost layer in-slot conductor portion 331a and the tail conductor portion 331f. The tail conductor portion 331f (which may be referred to as an inner layer side end portion), connected to the innermost layer in-slot conductor portion 331a, is twisted in the opposite circumferential direction.

Similarly, the small turning conductor segment 332 includes the inner middle layer in-slot conductor portion 332a and the tail conductor portion 332f. The tail conductor portion 332f (which may be referred to as an inner layer side end portion), connected to the inner middle layer in-slot conductor portion 332a, is twisted in the predetermined circumferential direction. Furthermore, the small turning conductor segment 331 includes the outer middle layer in-slot conductor portion 332b and the tail conductor portion 332g. The tail conductor portion 332g (which may be referred to as an outer layer side end portion), connected to the outer middle layer in-slot conductor portion 332b, is twisted in the opposite circumferential direction.

A sum of the circumferential twist amount of the tail conductor portion 331f and the circumferential twist amount of the tail conductor portion 332f is equivalent to one pole pitch. A sum of the circumferential twist amount of the tail conductor portion 331g and the circumferential twist amount of the tail conductor portion 332g is equivalent to one pole pitch.

Figure 6:
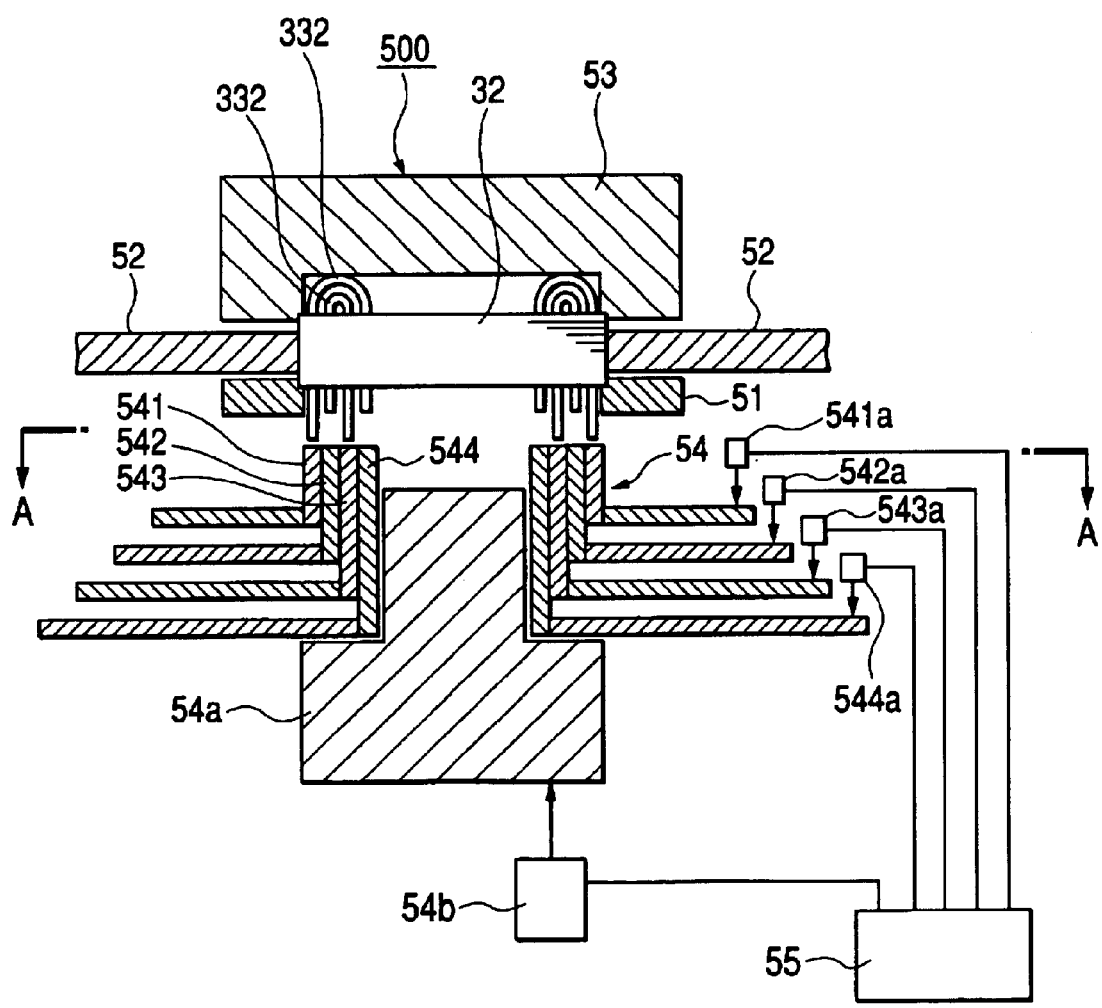
FIG. 6 is a vertical cross-sectional view schematically showing a twist shaping unit.
Figure 7:
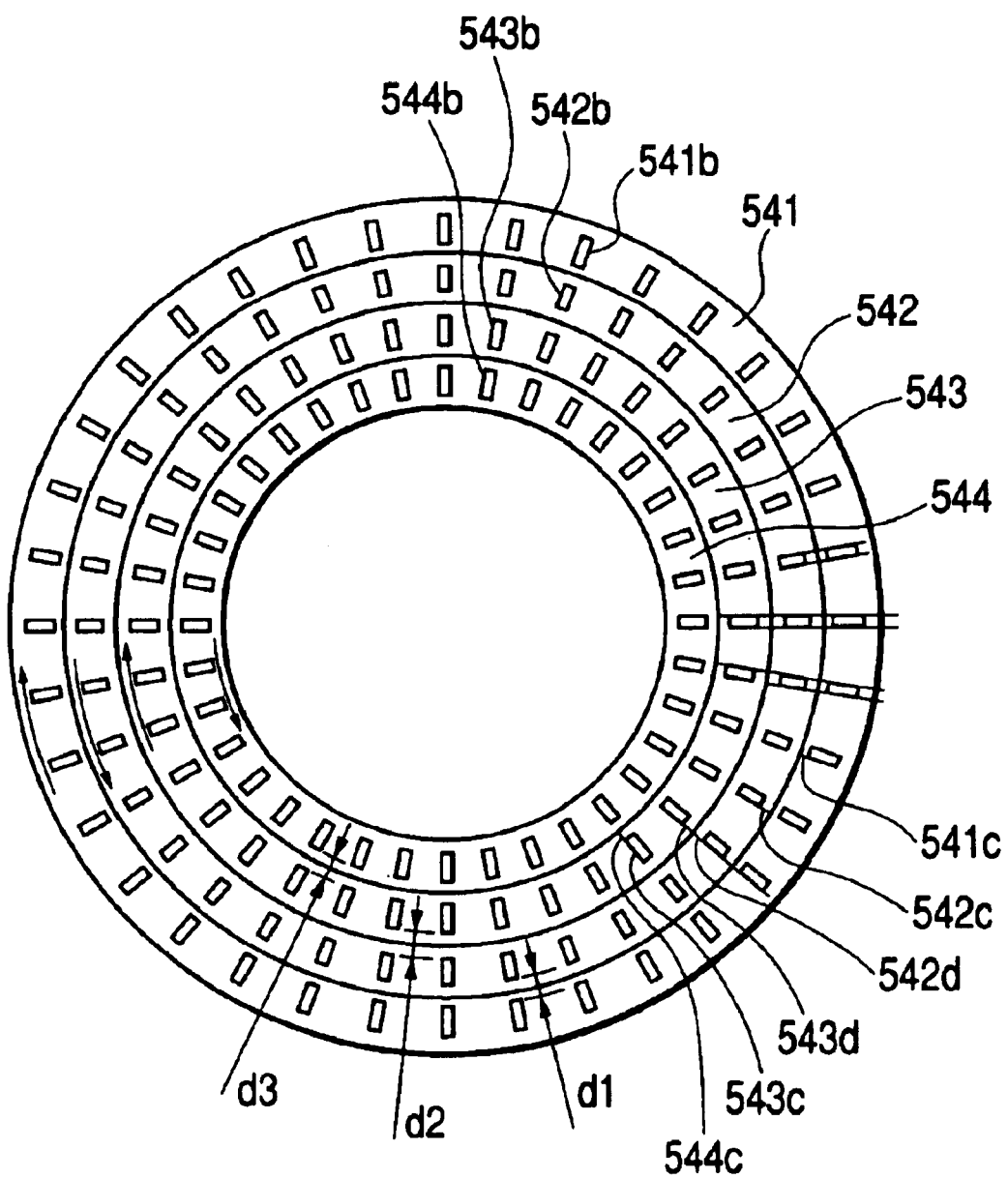
FIG. 7 is a plan view showing twisting jigs of the twist shaping unit shown in FIG. 6.

The process for twisting the large turning conductor segment 331 and the small turning conductor segment 332 will be explained in more detail with reference to FIGS. 6 and 7. FIG. 6 is a vertical cross-sectional view schematically showing a stator coil twisting apparatus 500. FIG. 7 is a cross-sectional view taken along a line A—A of FIG. 6.

First, the arrangement of the stator coil twisting apparatus 500 will be explained.

The stator coil twisting apparatus 500 includes a work receiver 51 for receiving an outer peripheral portion of the stator core 32, a damper 52 for regulating the movement of stator core 32 in the radial direction and for holding the stator core 32, a work presser 53 for preventing the stator core 32 from raising upward, a twist shaping unit 54 for twisting the legs of the segment 33 protruding from one end of the stator core 32, an elevating shaft 54a for shifting the twist shaping unit 54 in the axial direction, a plurality of rotary driving mechanisms 541a to 544a for rotating the twist shaping unit 54 in the circumferential direction, an axial driving mechanism 54b for shifting the elevating shaft 54a in the axial direction, and a controller 55 for controlling each of the rotary driving mechanisms 541a to 544a and the axial driving mechanism 54b.

The twist shaping unit 54 includes a total of four cylindrical twisting jigs 541 to 544 which are coaxially disposed, with their top end surfaces being arranged at the same height. The rotary driving mechanisms 541a to 544a independently rotate the corresponding cylindrical twisting jigs 541 to 544. The axial driving mechanism 54b shifts the elevating shaft 54a in the up-and-down direction so that all of the cylindrical twisting jigs 541 to 544 can be integrally raised or lowered.

As shown in FIG. 7, the twisting jigs 541 to 544 have conductor segment insertion holes 541b to 544b, on their top end surfaces, for receiving the distal ends (i.e., joint portions) of the tail conductor portions 331f, 331g, 332f, and 332g of the conductor segment 33 inserted into the slots of the stator core 32. The number of conductor segment insertion holes 541b to 544b is equal to the number of the slots 35 of stator core 32 (refer to FIGS. 3 and 4). The conductor segment insertion holes 541b to 544b are angularly spaced in the circumferential direction at predetermined intervals so as to correspond to the slots 35 of stator core 32. In FIG. 3, a reference numeral 34 represents an insulating resin sheet.

The conductor segment insertion holes 541b to 544b, as shown in FIG. 7, are provided with partition walls 541c to 544c, 542d, and 543d for preventing the conductor segment insertion holes 541b to 544b which are adjacent to each other in the radial direction from communicating with each other. The thickness of respective partition walls 541c to 544c, 542d, and 543d is determined in the following manner. The neighboring partition walls 541c and 542c cooperatively form a gap d1 at the boundary between the outermost layer and the outer middle layer. The neighboring partition walls 542d and 543d cooperatively form a gap d2 at the boundary between the outer middle layer and the inner middle layer. The neighboring partition walls 543c and 544c cooperatively form a gap d3 at the boundary between the inner middle layer and the innermost layer. The gap d2 is set to be larger than the gap d1 or the gap d3.

The stator coil twisting apparatus 500 functions in the following manner.

The stator core 32, with the conductor segments 33 disposed in its slots 35, is placed on the work receiver 51. Next, the outer cylindrical wall of the stator core 32 is fixed with the clamper 52. Thereafter, the work presser 53 depresses the upper portion of the stator core 32 as well as the head conductor portions 331c of the large turning conductor segments 331. Thus, the stator core 32 and the conductor segments 33 are surely fixed so as not to move in the up-and-down direction.

After the stator core 32 with the conductor segments 33 installed therein is fixed by using the clamper 52 and the work presser 53, the elevating shaft 54a raises the twist shaping unit 54 so that the tail conductor portions 331f, 331g, 332f, and 332g of respective conductor segments 33 are inserted into the conductor segment insertion holes 541b to 544b formed in respective twisting jigs 541 to 544.

The conductor segment insertion holes 541b to 544b can receive only the distal ends (which later become the joint portions) of tail conductor portions 331f, 331g, 332f, and 332g of respective conductor segments 33. As the tail conductor portions 331f, 331g, 332f, and 332g of respective conductor segments 33 are tapered, they can be smoothly inserted into the conductor segment insertion holes 541b to 544b.

After the tail conductor portions 331f, 331g, 332f, and 332g of respective conductor segments 33 are inserted into the conductor segment insertion holes 541b to 544b of the twist shaping unit 54, the twist shaping unit 54 is rotated by the rotary driving mechanisms 541a to 544a and raised or lowered by the axial driving mechanism 54b. The twist shaping unit 54 performs this operation for all of the twisting jigs 541 to 544 simultaneously.

Hereinafter, rotation of the twist shaping unit 54 is explained.

The twisting jigs 541 and 543 are rotated in the clockwise direction by a first angle, while the twisting jigs 542 and 544 are rotated in the counterclockwise direction by a second angle.

Important thing in this case is that the first angle is set to be larger than the second angle by an amount of 50% or more. With this setting, the bending radius is put to elongated portions (except for the joint portions) of the tail conductor portions 331f, 331g, 332f, and 332g of respective conductor segments 33 extending from the outlet of the slots 35 to the inlet of the conductor segment insertion holes 541b to 544b. Accordingly, a large bending radius is put to the tail conductor portions 331g and 332f while a small bending radius is put to the tail conductor portions 331f and 332g.

Thereafter, the twist shaping unit 54 is rotated by the rotary driving mechanisms 541a to 544a and raised by the axial driving mechanism 54b so that the elongated portions of the tail conductor portions 331f, 331g, 332f, and 332g of respective conductor segments 33 extending from the outlet of the slots 35 to the inlet of the conductor segment insertion holes 541b to 544b are maintained to have a constant length. In this case, the tail conductor portions 331f, 331g, 332f, and 332g of respective conductor segments 33 rotate and rise so as to trace an arc locus. Considering spring back deformation of respective conductor segments 33, the operation for twisting the tail conductor portions so as to trace an arc locus is performed until the angle exceeds a regulation angle equivalent to a half pole pitch (T/2) by a predetermined amount.

Furthermore, in addition to the circumferential direction, this twisting process includes an axial shifting of the twisting jigs 541 to 544 which is performed so as to exceed a regulation distance by a predetermined amount. As each conductor segment 33 is already bent at the outlet portion of the slot 35, the conductor segment 33 is not pulled out of the slot 35 when the conductor segment 33 rises.

Thereafter, the axial driving mechanism 54b and the rotary driving mechanisms 541a to 544a are controlled to rotate the twist shaping unit 54 in the opposite direction and lower it. After finishing the twisting process of respective conductor segments 33 in this manner, the twist shaping unit 54 is further lowered to remove the tail conductor portions 331f, 331g, 332f, and 332g of respective conductor segments 33 out of the conductor segment insertion holes 541b to 544b of the twisting jigs 541 to 544. After the conductor segments 33 are removed from the twist shaping unit 54, the rotary driving mechanisms 541a to 544a rotate the twist shaping unit 54 to return it to the original position. Finally, the damper 52 and the work presser 53 are released from the stator core 32. Then, the stator with the twisted conductor segments 33 is taken out.

Subsequently, neighboring ones of the joint portions 331d, 331e, 332d, and 332e of the tail conductor portions 331f, 331g, 332f, and 332g are welded to obtain a three-phase stator coil having a predetermined turn number.

After all, the above-described twisting process is characterized by first deforming the tail conductor portions of each conductor segment 33 in only the circumferential direction to make the conductor segment 33 incline in the circumferential direction, then deforming the tail conductor portions of each conductor segment 33 in both the circumferential direction and the axial direction to make the conductor segment 33 incline deeply, and thereafter excessively deforming the tail conductor portions of each conductor segment 33 in both the circumferential direction and the axial direction beyond the regulation values to make the conductor segment 33 incline excessively, and finally letting the tail conductor portions of each conductor segment 33 return to the regulation values due to self spring back deformation.

The twist shaping unit 54 causes the shift movement relative to the stator core 32 not only the circumferential direction but also in the axial direction. Hence, it becomes possible to twist the tail conductor portions 331f, 331g, 332f, and 332g of conductor segments 33 so as to trace an arc locus, according to which the length of the tail conductor portions 331f, 331g, 332f, and 332g except for the joint portions 331d, 331e, 332d, and 332e can be kept to a constant value. In other words, the elongated portions of the tail conductor portions 331f, 331g, 332f, and 332g of respective conductor segments 33 extending from the outlet of the slots 35 to the inlet of the conductor segment insertion holes 541b to 544b can be maintained to a constant length. As a result, it becomes possible to prevent the conductor segments 33 from being pulled out of the conductor segment insertion holes 541b to 544b.

Furthermore, only the joint portions 331d, 331e, 332d, and 332e of the conductor segments 33 are inserted into the conductor segment insertion holes 541b to 544b. As described above, this prevents the conductor segments 33 from being pulled out of the conductor segment insertion holes 541b to 544b. Accordingly, it becomes possible to prevent the portions of the conductor segments 33 except for the joint portions 331d, 331e, 332d, and 332e from being damaged or wounded. The joint portions 331d, 331e, 332d, and 332e are free from damage or wound because they are, after being twisted, welded with adjacent joint portions of other conductor segments.

Furthermore, regarding the thickness of respective partition walls 541c to 544c, 542d, and 543d, the gap defined by the partition walls 542d and 543d at the boundary between the outer middle layer and the inner middle layer is set to be larger than the gap defined by the partition walls 541c and 542c at the boundary between the outermost layer and the outer middle layer or the gap defined by the partition walls 543c and 544c at the boundary between the inner middle layer and the innermost layer.

The outermost layer and the outer middle layer are rotated in the opposite directions so as to cause a mutual displacement equivalent to a half pole pitch. The innermost layer and the inner middle layer are rotated in the opposite directions so as to cause a mutual displacement equivalent to a half pole pitch. The conductor segments of the outermost layer and the outer middle layer approach to each other, while the conductor segments of the innermost layer and the inner middle layer approach to each other. The gap between the partition walls 542d and 543d at the boundary between the outer middle layer and the inner middle layer is set to be large. Hence, the clearance between the conductor segment 33 of the outer middle layer and the conductor segment 33 of the inner middle layer is relatively large. On the other hand, the clearance between two conductor segments 33 to be welded each other becomes small. More specifically, the clearance between the conductor segment 33 of the outermost layer and the conductor segment 33 of the outer middle layer becomes relatively small. The clearance between the conductor segment 33 of the innermost layer and the conductor segment 33 of the inner middle layer becomes relatively small. In other words, the clearance between the conductor segments 33 not welded each other is maintained to a relatively large value. This is effective to facilitate the welding process.

Furthermore, the twisting jigs 541, 542, 543, and 544 are exchangeable so as to fit to any type of stator. For example, the slot number of the stator is not limited to 36 slots. Accordingly, by exchanging the twisting jigs 541, 542, 543, and 544, the twist shaping unit 54 is applicable to any type of a stator whose slot number may be 48, 84, 96, or others. It is possible to independently control the rotational amount of the twisting jigs 541, 542, 543, and 544. The axial shift amount of the twist shaping unit 54 is controlled independent of the rotational amount of the twisting jigs 541, 542, 543, and 544. Thus, the twist shaping unit 54 of this embodiment is applicable to various types of stators for performing the twist process appropriately.

4. Welding Process

The welding process will be explained hereinafter, although the substance of this process is conventionally well known.

After the twisting process of the conductor segments is accomplished, the conductor segment 33 of the innermost layer and the conductor segment 33 of the inner middle layer are welded at their distal ends (i.e., the joint portions) as shown in FIG. 2. Similarly, the conductor segment 33 of the outermost layer and the conductor segment 33 of the outer middle layer are welded at their distal ends (i.e., the joint portions). The stator coil 31 is thus accomplished. The practical welding used in this embodiment is, for example, TIG welding, brazing, electron-beam welding, laser welding, or the like.

Figure 8:
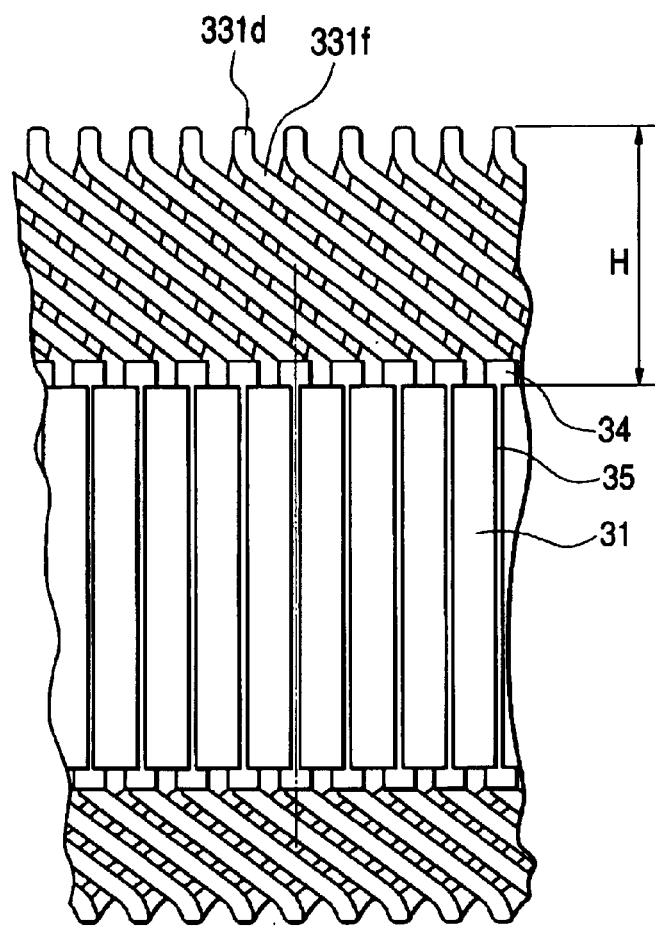
FIG. 8 is a radial development view partially showing the stator coil manufactured by the twist shaping unit.
Figure 9:
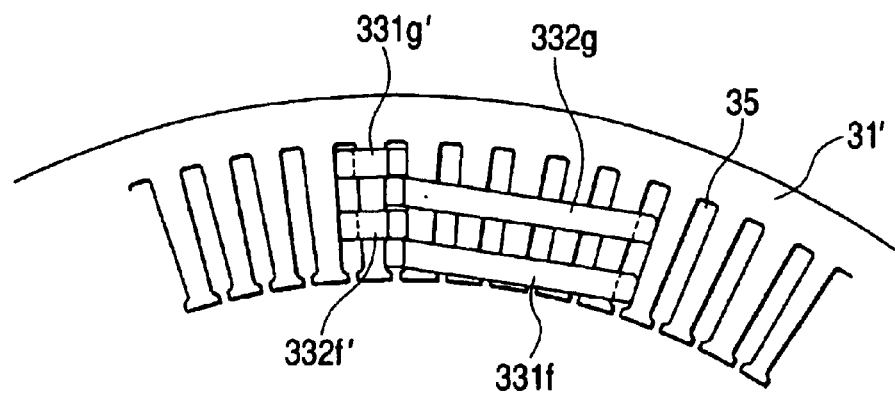
FIG. 9 is a front view partially showing the stator coil of FIG. 8.

FIGS. 8 and 9 show the stator coil 31 being thus accomplished. However, according to this embodiment, the tail conductor portions 331f and 332g are largely twisted (or inclined) in the circumferential direction compared with the tail conductor portions 331g and 332f.

As apparent from the foregoing description, the preferred embodiment of the present invention provides a coil for an electric rotary machine including a plurality of conductor segments (33) each having a V-shaped head conductor portion (331c, 332c), a pair of in-slot conductor portions (331a, 331b, 332a, 332b) extending from both ends of the head conductor portion and accommodated in two different slots (35) of a core (32), and a pair of tail conductor portions (331f, 331g, 332f, 332g) continuing from the in-slot conductor portions and protruding out of axially opposite openings of the slots and extending at least in a circumferential direction. The conductor segments (33) are successively connected by joining distal ends (331d, 331e 332d, 332e) of the tail conductor portions. The head conductor portion of each conductor segment constitutes part of a head side coil end (311, 600) of the coil (31). The tail conductor portion of each conductor segment constitutes part of a tail side coil end (312) of the coil (31). The head conductor portion or the tail conductor portion includes a V-angled portion (3310) and straight portions (3320). The V-angled portion (3310) includes an apex positioned farthest in an axial direction from the core and slant portions extending from the apex in both circumferential directions so as to gradually approach to an end surface of the core. Each of the straight portions (3320) is bent from an end of the V-angled portion so as to extend straight in a line with the in-slot conductor portion (331a, 331b). And, an axial length of each the straight portions (3320) is longer than an axial length of the V-angled portion (3310).

Furthermore, the preferred embodiment of the present invention provides a method for manufacturing the coil for an electric rotary machine, including a conductor segment inserting process, a conductor segment returning process, a tail conductor portion twisting process, and a joining process. The conductor segment inserting process is for inserting each conductor segment (33) into a slot (35) of the core (32) in the axial direction until a bend point (3331h, 332h, 3330) between the V-angled portion (3310) and each straight portion (3320) reaches an axially near-side opening (35a) of the slot (35), while allowing each tail conductor portion (331f, 331g, 332f, 332g) to protrude out of the core from an axially far-side opening (35b) of the slot. The conductor segment returning process is for returning the conductor segment (33) back in the axial direction by a predetermined length (L2) to form the head side coil end (311, 600). The tail conductor portion twisting process is for twisting each tail conductor portion in the circumferential direction by a predetermined angle. And, the joining process is for joining the distal ends (331d, 331e 332d, 332e) of the tail conductor portions according to predetermined pairings.

Effects of Embodiment

According to the above-described embodiment, the large U-shaped turning conductor segment 331 constitutes a head side coil end 600 of stator coil 31. The large U-shaped turning conductor segment 331 has the head conductor portion consisting of the V-angled portion 3310 and a pair of straight portions 3320. Each straight portion 3320 extends out of the slot 35 from an axially near-side opening 35a and aligned in a line with the in-slot conductor portion 331a or 331b. The protruding distal end portions 350 protrudes from an axially far-side opening 35b of the slot 35. Similarly, the small U-shaped turning conductor segment 332 has the head conductor portion consisting of a V-angled portion and a pair of straight portions. The boundary (i.e., bend point 3330) between the V-angled portion 3310 and each straight portion 3320 is spaced sufficiently far from the sharp edge of the axially near-side opening 35a of slot 35. This effective prevents the resin film covering the surface of the conductor segment 33 from being pressed hardly to the sharp edge of the opening periphery of the slot. Thus, it becomes possible to satisfactorily maintain the insulation property of the resin film of the conductor segment.

Furthermore, cooling air can smoothly flow in radial directions via the clearances between the slots arrayed at predetermined angular intervals in the circumferential direction without being blocked by the conductor segments. In this case, the clearances between the slots are portions which are next to so-called teeth of the stator core in the axial direction. Thus, cooling performance of the stator core is improved.

Figure 10:
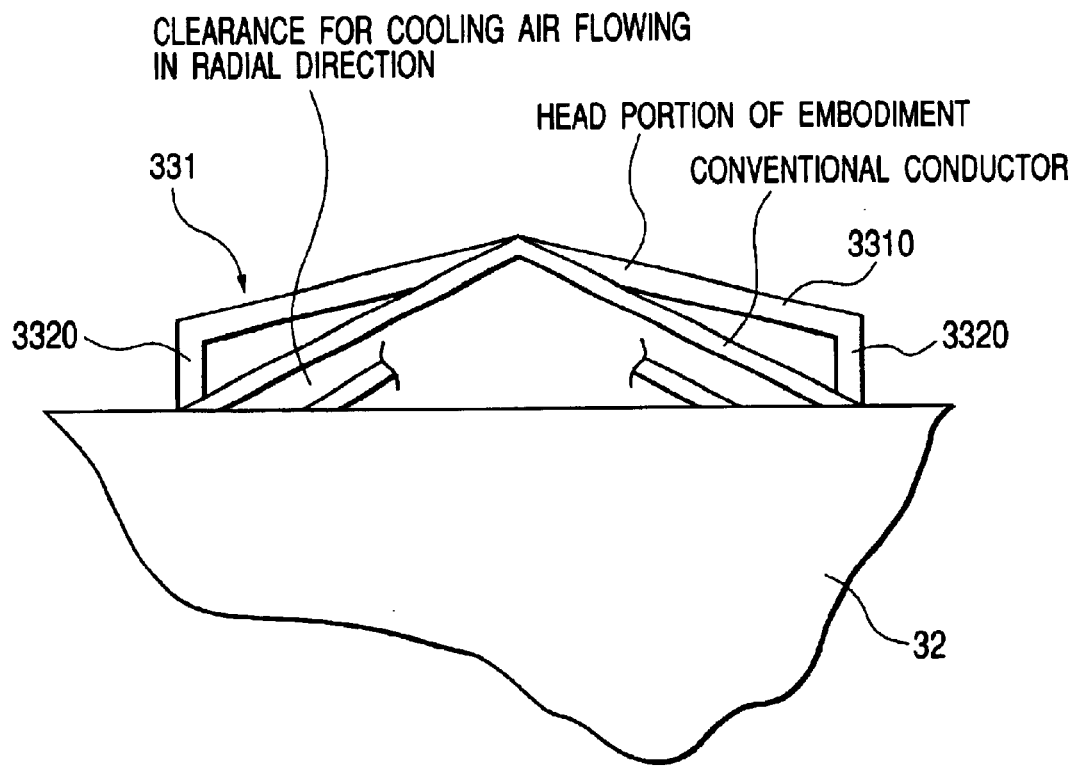
FIG. 10 is a comparative view showing the difference between a head conductor portion according to the preferred embodiment of the present invention and a conventional head conductor portion.

Furthermore, the head conductor portion of the conductor segment is configured into a pentagonal shape. As comparatively shown in FIG. 10, the total length of the head conductor portion is longer than that of a conventional triangular one under the condition that the axial protruding length of the head conductor portion is the same. The total surface of the head conductor portion to be exposed to the cooling air is increased. This is effective to improve the cooling performance of the head side coil end.

It is preferable that an axially protruding distance of the straight portion 3320 is longer than that of the V-angled portion 3310 so as to enhance the above-described effects.

Other effect of the above-described embodiment will be explained hereinafter.

According to the above-described embodiment, each in-slot conductor portion is made of a flat type of a rectangular wire. At least one side surface of the in-slot conductor portion is entirely brought into face-to-face contact with the flat inner surface of the slot via an insulator. The straight portion of the V-shaped head conductor portion integrally extends from the in-slot conductor portion so as to constitute one coil end. The straight portion of the V-shaped head conductor portion extends straight in a line with the in-slot conductor portion beyond the slot opening by a predetermined distance. Thus, the sharp edge of the stator core, defining the slot opening, does not damage or wound the insulating resin film covering the surface of the coil conductor.

Other effect of the above-described embodiment will be explained hereinafter.

According to the above-described embodiment, the protruding length of each head conductor portion (i.e., apex of the head portion) from the end surface of the stator core is set to be the same value. This arrangement is advantageous in that, when seen on a projection surface perpendicular to the radial direction, most of the conductors overlap each other. The air flow loss is greatly reduced. Hence, when the forced cooling air flowing in radial directions is applied to the head side coil end or to the tail side coil end, the fluid resistance is small.

Modified Embodiment

According to the above-described embodiment, the axial length of the straight portion of the head conductor portion is set to be smaller than that of the V-angled portion of the head conductor portion. It is, however, preferable to set the axial length of the straight portion to be larger than that of the V-angled portion. Although increase in the axial length of the coil end leads to increase in the size of a rotary motor, the effect of applying the forced air cooling to the coil end will be enhanced in this case.

Modified Embodiment

According to the above-described embodiment, the stator coil is formed by welding the distal ends of the conductor segments, each having a head portion being configured beforehand into V shape (hereinafter, referred to as V-shaped conductor segment), at only one side of the stator core. Alternatively, it is possible to weld the conductor segments at both sides of the stator core. In this case, the above-described V-shaped conductor segments can be replaced with later-described oblique L-shaped conductor segments and I-shaped conductor segments to weld them at both sides of the stator core and finally obtain the V-shaped conductor segments of the present invention.

Modified Embodiment

According to the above-described embodiment, the head conductor portion of each conductor segment consists of the V-angled portion and the straight portions. The bend point (i.e., boundary) between the V-angled portion and each straight portion is kept far from the sharp edge of the core defining the slot opening. However, it is possible to modify each straight portion of the V-shaped conductor segment into a combination of a straight portion and a partial V-angled portion (i.e., a half symmetrical cut of the V-shaped head portion). In this case, a bend point between the straight portion and the partial V-angled portion is kept far from the sharp edge of the core defining the slot opening to obtain the same functions and effects with respect to the insulation properties. Regarding the above-noted oblique L-shaped conductor segments and I-shaped conductor segments, it is preferable that the tail conductor portions have similar straight portions so as to ensure the above-described functions and effects.

Modified Embodiment

The above-described embodiment is an example of the present invention applied to a stator coil wound around a stator core. However, the subject matter of the present invention resides in that the V-shaped conductor segment includes a V-angled portion and a pair of straight portions cooperative constituting a head portion and that the bend pont between the V-angled portion and each straight portion is kept far from the sharp edge of a stator core defining the slot opening. The subject matter of the present invention is also effected in a case where the V-shaped conductor segments are installed in slots of the rotor core. Accordingly, the present invention encompasses not only the above-described stator coil but also a rotor coil wound around a rotor core as long as the conductor segments of the rotor coil have a head conductor portion consisting of a V-shaped bend portion and a pair of straight portions and the bend point between the V-angled portion and each straight portion is kept far from the sharp edge of the rotor core defining the slot opening.

Modified Embodiment

According to the above-described embodiment, the straight portions are provided at the head conductor portion of the conductor segments. However, it is also preferable that the similar straight portions are provided at the tail conductor portion of the conductor segments which protrude the other side of the core. With this arrangement, it becomes possible to prevent the insulating resin film covering the surface of the conductor segment from being damaged or wounded by the sharp edges of the core at both head and tail sides thereof.

Figure 11:
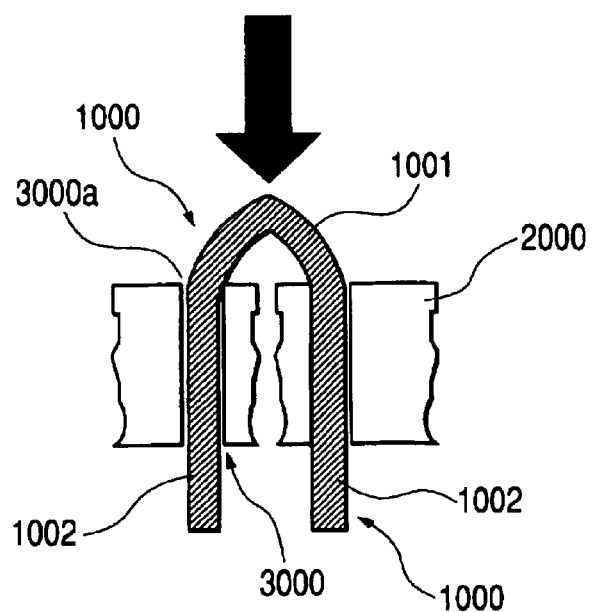
FIG. 11 is a cross-sectional view schematically showing a process for installing a V-shaped conductor segment into slots of a stator core and bending distal ends thereof.
Figure 12:
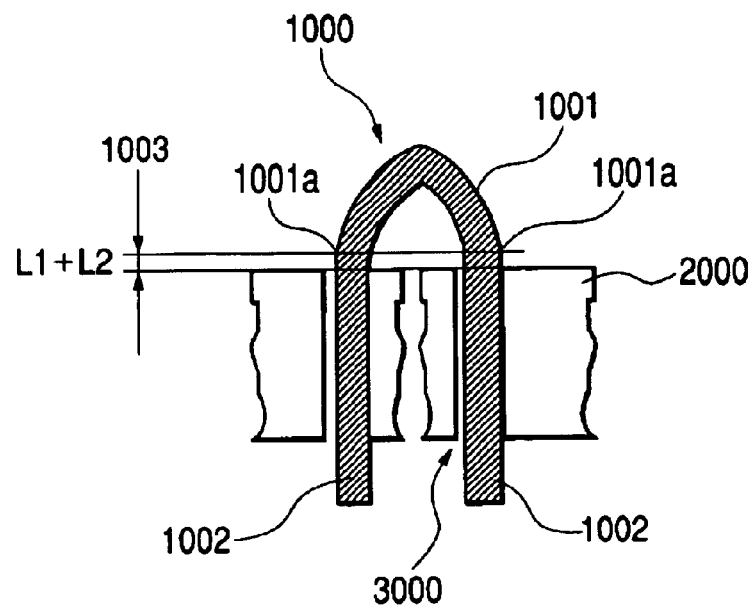
FIG. 12 is a cross-sectional view schematically showing a process for installing the V-shaped conductor segment into the slots of the stator core and bending distal ends thereof.

FIGS. 11 through 14 show the detailed process for installing a V-shaped conductor segment 1000 into slots of a stator core 2000. Although being renumbered in these drawings, the V-shaped conductor segment is the one explained in the above-described embodiment. The V-shaped conductor segment 1000 includes a V-angled portion 1001 configured beforehand into V shape and a pair of straight legs 1002 extending straight from both ends (i.e., bend point 1001a) of the V-angled portion 1001 in parallel with each other. The straight legs 1002 of the V-shaped conductor segment 1000 are inserted into slots 3000 of the stator core 2000 in the axial direction from an axially near-side opening 3000a of the slot 3000 (as shown in FIG. 11). In this case, the insertion depth of the V-shaped conductor segment 1000 is set to a predetermined value so that each leg 1002 has a residual root portion 1003 protruding out of the axially near-side opening 3000a of the slot 3000 toward the V-angled portion 1001. The length of the residual root portion 1003 is regulated to a predetermined length L1+L2 (as shown in FIG. 12).

As described above, to form the residual root portion 1003 having a predetermined length of L1+L2, the V-shaped conductor segment 1000 is fully inserted into slots 3000 in the axial direction and then is pulled back by a predetermined length L1. Alternatively, the V-shaped conductor segment 1000 is inserted into slots 3000 in the axial direction but stopped before it reaches the dead end so as to leave the residual root portion 1003 having the length of L1.

Figure 13:
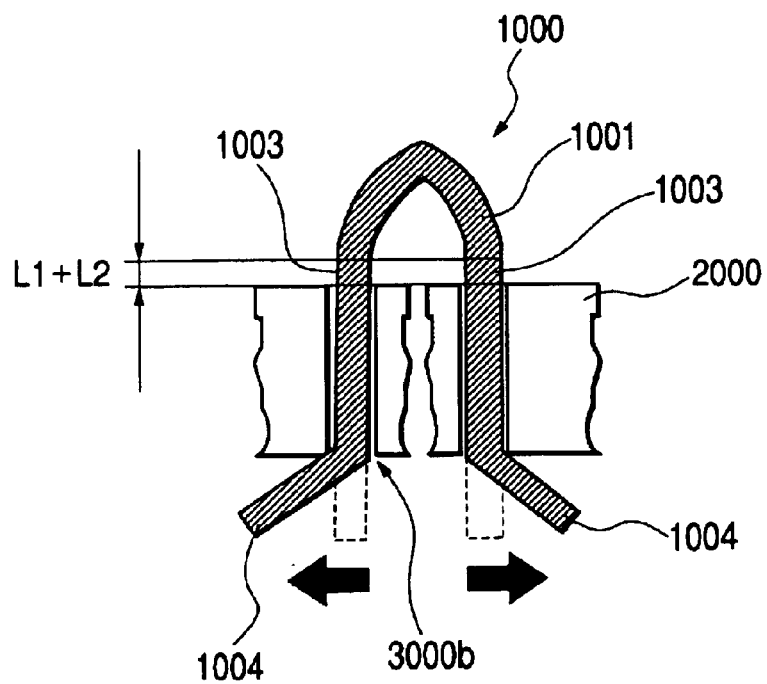
FIG. 13 is a cross-sectional view schematically showing a process for installing the V-shaped conductor segment into the slots of the stator core and bending distal ends thereof.

Next, the part of each leg 1002 protruding from the slot 3000 toward the far side opposite to the V-angled portion 1001 is bent, at an axially far-side opening 3000b of the slot 3000, into a tilt portion 1004 by bending the leg 1002 in the circumferential direction (as well as, if necessary, in the radial direction) about the pivot on the side surface of the stator core 2000 (as shown in FIG. 13).

Next, the V-shaped conductor segment 1000 is depressed in the axial direction toward the tilt portions 1004 by the predetermined length L2 so as to leave straight portions 1005 continuing from both ends of the V-angled portion 1001 and extending in a line with the straight leg 1002 accommodated in the slot 3000 at one side of the stator core 2000 (i.e., at the axially near-side opening 3000a) and another straight portions 1006 continuing from respective tilt portions 1004 and extending in a line with the straight leg 1002 accommodated in the slot 3000 at the other side of the stator core 2000 (i.e., at the axially far-side opening 3000b).

In this specification, the V-angled portion 1001 and the straight portions 1005 are collectively referred to as a head conductor portion 1007 or a V-shaped head portion. The tilt portion 1004 and the straight portion 1006, which are continuous with each other, are collectively referred to as a protruding tail conductor portion. Furthermore, each straight leg 1002 accommodated in the slot 3000 is referred to as in-slot conductor portion.

Figure 14:
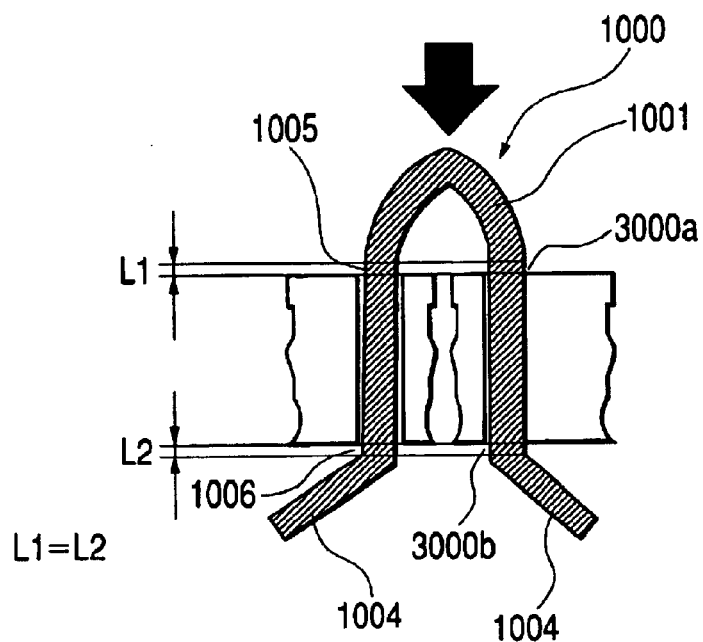
FIG. 14 is a cross-sectional view schematically showing a process for installing the V-shaped conductor segment into the slots of the stator core and bending distal ends thereof.

With the above-described processing, the conductor segments have, at both side surfaces of the stator core 2000, the straight portions 1005 and 1006 protruding out of the slots and extending in the axial direction (as shown in FIG. 14). Thus, it becomes possible to prevent the insulating resin film covering the surface of V-shaped conductor segment 1000 from being damaged or wounded by the sharp edges of the stator core 2000 defining the slot openings 3000a and 3000b (opened in the axial direction).

Modified Embodiment

Figure 15:
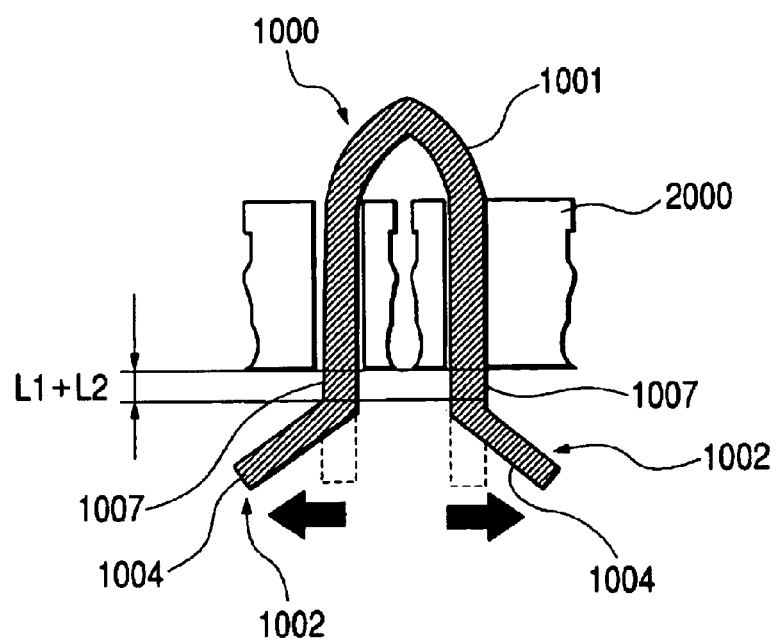
FIG. 15 is a cross-sectional view schematically showing a process for installing the V-shaped conductor segment into the slots of the stator core and bending distal ends thereof.
Figure 16:
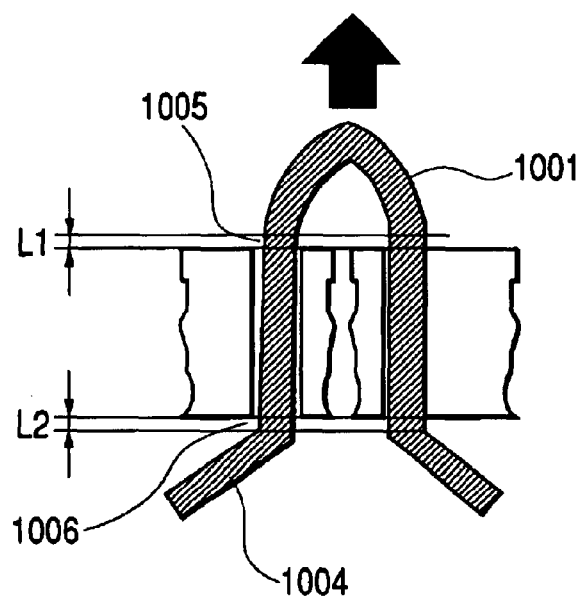
FIG. 16 is a cross-sectional view schematically showing a process for installing the V-shaped conductor segment into the slots of the stator core and bending distal ends thereof.

FIGS. 11, 15 and 16 show a modified process for installing the V-shaped. conductor segment 1000 into the slots of the stator core 2000. First, the legs of V-shaped conductor segment 1000 are inserted into the slots 3000 of stator core 2000 in the axial direction from one side of the stator core 2000 (as shown in FIG. 11).

Next, the part of each leg 1002 protruding from the slot 3000 toward the far side opposite to the V-angled portion 1001 is bent, at the portion offset from the side surface of the stator core 2000 by the length of L1+L2, into the tilt portion 1004 (as shown in FIG. 15).

Next, the V-shaped conductor segment 1000 is pushed back in the axial direction toward the V-angled portion 1001 by the predetermined length L1 so as to leave the straight portions 1005 continuing from both ends of the V-angled portion 1001 and extending in a line with the straight leg 1002 accommodated in the slot 3000 at one side of the stator core 2000 (i.e., at the axially near-side opening 3000a) and the straight portions 1006 continuing from respective tilt portions 1004 and extending in a line with the straight leg 1002 accommodated in the slot 3000 at the other side of the stator core 2000 (i.e., at the axially far-side opening 3000b).

Like the above case, the V-angled portion 1001 and the straight portions 1005 are collectively referred to as the head conductor portion 1007 or the V-shaped head portion. The tilt portion 1004 and the straight portion 1006, which are continuous with each other, are collectively referred to as the protruding tail conductor portion. Furthermore, each straight leg 1002 accommodated in the slot 3000 is referred to as the in-slot conductor portion.

With the above-described processing, it becomes possible to prevent the insulating resin film covering the surface of V-shaped conductor segment 1000 from being damaged or wounded by the sharp edges of the stator core 2000.

Modified Embodiment

Figure 17:
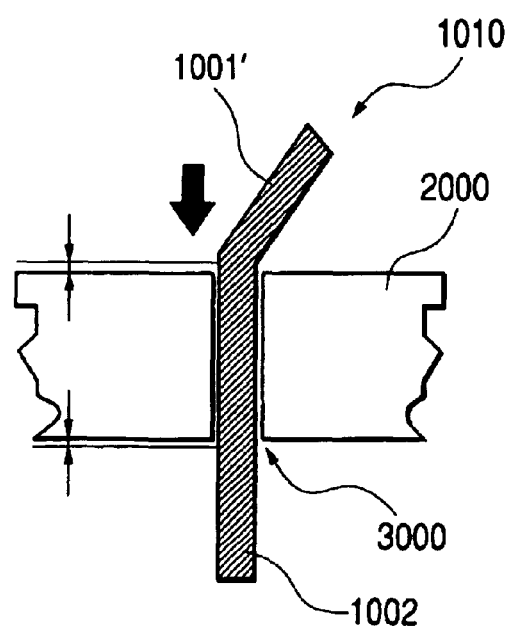
FIG. 17 is a cross-sectional view schematically showing a process for installing an inclined L-shaped conductor segment into a slot of the stator core and bending distal end thereof.
Figure 18:
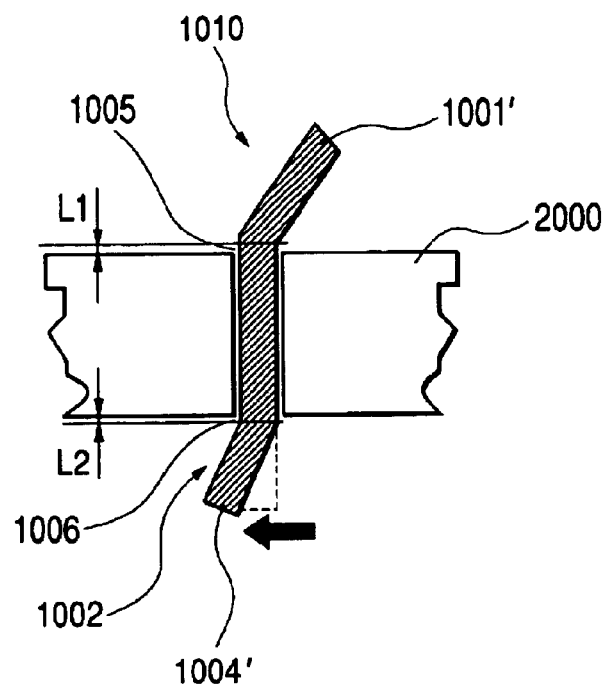
FIG. 18 is a cross-sectional view schematically showing a process for installing the inclined L-shaped conductor segment into the slot of the stator core and bending distal ends thereof.

FIGS. 17 and 18 show another modified process for installing the conductor segment into the slot of the stator core 2000. After an oblique L-shaped conductor segment 1010 is inserted into the slot 3000, the protruding portions of the oblique L-shaped conductor segment 1010 are bent at both sides of the stator core 2000 so as to leave the straight portion 1005 and the straight portion 1006 which extend in a line with the straight leg accommodated in the slot 3000. Then, the conductor segments are welded to form a V-shaped coil end similar to the above-described V-shaped conductor segment 1000. The oblique L-shaped conductor segment consists of a partial V-angled portion 1001' and the straight leg 1002. The partial V-angled portion 1001' is a half symmetrical cut of the V-angled portion 1001 shown in FIG. 14 which is divided at the apex thereof. The cutting portion of the L-shaped conductor segments 1010 is arbitrarily changed to other portion as long as the V-shaped conductor segment 1000 is obtained by welding the L-shaped conductor segments 1010.

First, the oblique L-shaped conductor segment 1010 is inserted into the slot 3000 in the axial direction from one side of the stator core 2000 (as shown in FIG. 17).

Next, the part of the leg 1002 protruding from the slot 3000 toward the far side opposite to the partial V-angled portion 1001' is bent into a tilt portion 1004'.

Thereafter, a pair of L-shaped conductor segments 1010 are welded at their upper ends to form the V-shaped conductor segment 1000.

Regarding the method for forming the straight portions 1005 and 1006, either the method explained with reference to FIGS. 11 to 14 or the method explained with reference to FIGS. 11, 15 and 16 can be used for this embodiment.

Modified Embodiment

Figure 19:
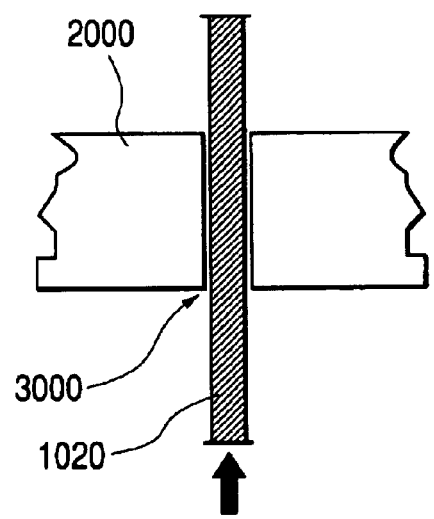
FIG. 19 is a cross-sectional view schematically showing a process for installing an I-shaped conductor segment into a slot of the stator core and bending distal end thereof.
Figure 20:
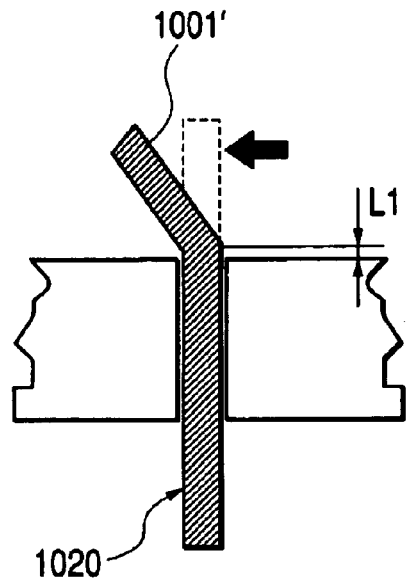
FIG. 20 is a cross-sectional view schematically showing a process for installing the I-shaped conductor segment into the slot of the stator core and bending distal ends thereof.
Figure 21:
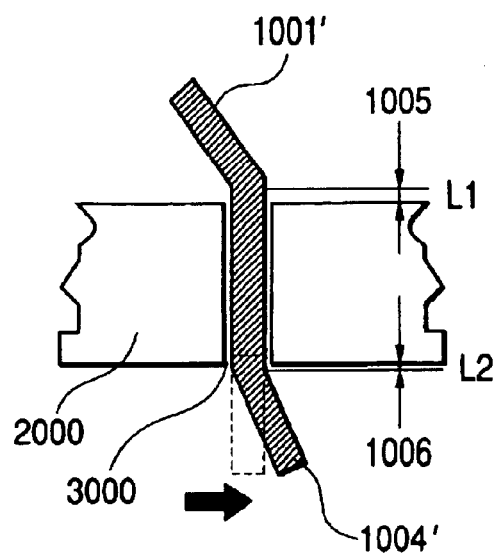
FIG. 21 is a cross-sectional view schematically showing a process for installing the I-shaped conductor segment into the slot of the stator core and bending distal ends thereof.

FIGS. 19 to 21 show another modified process for installing the conductor segment into the slot of the stator core 2000. In this embodiment, the oblique L-shaped conductor segment 1010 is replaced with an I-shaped conductor segment 1020. After the oblique I-shaped conductor segment 1020 is inserted into the slot 3000, the I-shaped conductor segment 1020 is configured into the above-described L-shaped conductor segment 1010 by bending one protruding portion of the I-shaped conductor segment 1020. Thereafter, the other protruding portion of the I-shaped conductor segment 1020 is bent. Then, a pair of oblique L-shaped conductor segments 1010 are welded at their upper ends to form the V-shaped conductor segment 1000.

Regarding the method for forming the straight portions 1005 and 1006 in the process for configuring the partial V-angled portion 1001' and the tilt portion 1004' at both sides of each I-shaped conductor segment 1020, either the method explained with reference to FIGS. 11 to 14 or the method explained with reference to FIGS. 11, 15 and 16 can be used for this embodiment.

As apparent from the foregoing description, the preferred embodiment of the present invention provides a method for manufacturing an electric rotary machine including a winding and a core. The winding consists of a plurality of conductor segments (1000), each comprising a V-shaped head conductor portion (1001) and a pair of straight conductor portions (1002) extending from both ends of the V-shaped portion. The conductor segments are covered by an insulating film and successively joined at distal ends of the straight conductor portions. The core includes a plurality of slots (3000) arrayed at predetermined angular intervals in a circumferential direction for accommodating the conductor segments (1000). Each of the slots has an axially near-side opening (3000a) through which the straight conductor portion (1002) is inserted into the slot (3000) and an axially far-side opening (3000b) from which the distal end of the straight conductor portion protrudes. The V-shaped head conductor portion (1001) of each conductor segment is held at one side of the core where the axially near-side opening (3000a) is provided, and protruding portions (1004) of the straight conductor portions are held at the other side of the core where the axially far side opening (3000b) is provided. This manufacturing method includes an accommodating process, a twist shaping process, and a shifting process. The accommodating process is for accommodating the straight conductor portions (1002) of each conductor segment into different slots (3000) so that at least part of each straight conductor portion extends as an exposed straight portion (1005, 1006) out of the slot from either the axially near-side opening or the axially far-side opening by a predetermined length. The twist shaping process is for twisting the protruding portions (1004) of the straight conductor portions in the circumferential direction. And, the shifting process is for shifting the straight conductor portion (1002) into the slot (3000) from one of the axially near-side opening or the axially far-side opening so that at least part of the exposed straight portion (1005, 1006) is accommodated in the slot and is for allowing the straight conductor portion (1002) to protrude out of the slot as another exposed straight portion (1005, 1006) from the other of the axially near-side opening or the axially far-side opening.

What is claimed is:

1. A method for manufacturing an electric rotary machine including a winding and a core, said winding consisting of a plurality of conductor segments, each comprising a V-shaped head conductor portion and a pair of straight conductor portions extending from both ends of said V-shaped portion, which are covered by an insulating film and successively joined at distal ends of said straight conductor portions, and said core comprising a plurality of slots arrayed at predetermined angular intervals in a circumferential direction for accommodating said conductor segments, each of said slots having an axially near-side opening through which said straight conductor portion is inserted into said slot and an axially far-side opening from which the distal end of said straight conductor portion protrudes, so that said V-shaped head conductor portion of each conductor segment is held at one side of said core where said axially near-side opening is provided and protruding portions of said straight conductor portions are held at the other side of said core where said axially far side opening is provided, said manufacturing method comprising:

an accommodating process for accommodating said straight conductor portions of each conductor segment into different slots so that at least part of each straight conductor portion extends as an exposed straight portion out of the slot from either said axially near-side opening or said axially far-side opening by a predetermined length, a twist shaping process for twisting said protruding portions of said straight conductor portions into tilt portions inclining in the circumferential direction, a shifting process for retracting said straight conductor portion into said slot from one of said axially near-side opening and said axially far-side opening after finishing said twist shaping process so that at least part of said exposed straight portion remains as one exposed straight portion having a first length and at the same time protruding the other side of said straight conductor portion out of said slot as another exposed straight portion having a second length from the other of said axially near-side opening and said axially far-side opening, thereby leaving said one and another exposed straight portions at both said axially near-side opening and said axially far-side opening of said slot.

2. The method for manufacturing an electric rotary machine in accordance with claim 1, wherein said shifting process is performed in such a manner that said straight conductor portion is stopped at an axial position so that exposed straight portions exist at both of said axially near-side opening and said axially far-side opening of the slot.

3. The method for manufacturing an electric rotary machine in accordance with claim 1, wherein said twist shaping process is performed in such a manner that the protruding portion of each straight conductor portion is bent about said axially far-side opening of the slot, and said shifting process is performed in such a manner that a bend point of said protruding portion of each straight conductor portion is offset far from said axially far-side opening of the slot.

4. The method for manufacturing an electric rotary machine in accordance with claim 1, further comprising a joining process, succeeding said shifting process, for successively joining the distal ends of said straight conductor portions.

5. A method for manufacturing an electric rotary machine including a winding and a core, said winding consisting of a plurality of conductor segments, each comprising a V-shaped head conductor portion and a pair of straight conductor portions extending from both ends of said V-shaped portion, which are covered by an insulating film and successively joined at distal ends of said straight conductor portions, and said core comprising a plurality of slots arrayed at predetermined angular intervals in a circumferential direction for accommodating said conductor segments, each of said slots having an axially near-side opening through which said straight conductor portion is inserted into said slot and an axially far-side opening from which the distal end of said straight conductor portion protrudes, so that said V-shaped head conductor portion of each conductor segment is held at one side of said core where said axially near-side opening is provided and protruding portions of said straight conductor portions are held at the other side of said core where said axially far side opening is provided, said manufacturing method comprising:

an accommodating process for accommodating said straight conductor portions of each conductor segment into different slots so that at least part of each straight conductor portion extends as an exposed straight portion out of the slot from either said axially near-side opening or said axially far-side opening by a predetermined length;

a twist shaping process for twisting said protruding portions of said straight conductor portions in the circumferential direction;

a shifting process for shifting said straight conductor portion into said slot from one of said axially near-side opening or said axially far-side opening so that at least part of said exposed straight portion is accommodated in said slot and allowing said straight conductor portion to protrude out of said slot as another exposed straight portion from the other of said axially near-side opening or said axially far-side opening; and a holding member inserting process, succeeding said shifting process, for inserting a holding member between an inner wall of the slot and the straight conductor portion accommodated in said slot.

* * * * *